(12) United States Patent
Ram et al.

(10) Patent No.: US 12,045,111 B2
(45) Date of Patent: Jul. 23, 2024

(54) ARCHITECTURES FOR DETECTING USB TYPE-C DEVICE EXPOSURE TO LIQUIDS

(71) Applicant: Cypress Semiconductor Corporation, San Jose, CA (US)

(72) Inventors: Shopitham Ram, San Jose, CA (US); David Neal, Chester, NH (US); Savan Javia, Austin, TX (US); Carl Finke, Northport, NY (US)

(73) Assignee: Cypress Semiconductor Corporation, San Jose, CA (US)

( * ) Notice: Subject to any disclaimer, the term of this patent is extended or adjusted under 35 U.S.C. 154(b) by 56 days.

(21) Appl. No.: 18/073,711

(22) Filed: Dec. 2, 2022

(65) Prior Publication Data
US 2024/0184345 A1    Jun. 6, 2024

(51) Int. Cl.
*G06F 1/32* (2019.01)
*G06F 1/26* (2006.01)
*G06F 1/28* (2006.01)
*G06F 13/42* (2006.01)

(52) U.S. Cl.
CPC .............. *G06F 1/28* (2013.01); *G06F 1/266* (2013.01); *G06F 13/4282* (2013.01); *G06F 2213/0042* (2013.01)

(58) Field of Classification Search
CPC ............. G06F 1/32; G06F 1/28; G06F 9/44
See application file for complete search history.

(56) References Cited

U.S. PATENT DOCUMENTS

2020/0259298 A1* 8/2020 Tyrrell .................. H01R 13/70
2023/0025195 A1* 1/2023 Luo ...................... H01R 13/6683

OTHER PUBLICATIONS

NX20P0477 USB Type-C CC smart protection, Product data sheet, Rev. 1.0—Feb. 3, 2020, http://www.nxp.com, 24 pages.
FUSB251 Type-C CC and SBU Protection IC, www.onsemi.com, Feb. 2019—Rev. 0, 19 pages.
CYPM1111 CYPM1111, Infineon, EZ-PD™ PMG1-S1 Power Delivery MCU EZ-PD™ PMG1-S1 Power Delivery MCU, www.infineon.com, May 18, 2022, 48 pages.
Infineon, EZ-PD™ CCG6 USB Type-C Port Controller, www.infineon.com, Revised Jul. 26, 2021, 39 pages.
NXP Semiconductors, USB Type-C CC smart protection, NX20P0477, 2020, 24 pages.
ON Semiconductor, Type-C CC and SBU Protection IC, FUSB251, 2019, 19 pages.

* cited by examiner

Primary Examiner — Keshab R Pandey

(57) ABSTRACT

A system includes a USB-C receptacle including first and second non-GPIO pins and a USB-C controller including a first GPIO pin connected to a pull-up resistor and a second GPIO pin connected to a pull-down resistor, a pair of non-GPIO pins including a third non-GPIO pin corresponding to the first non-GPIO pin and a fourth non-GPIO pin corresponding to the second non-GPIO pin. The pair of GPIO pins is selectively connectable to the pair of non-GPIO pins using a multiplexer, and liquid exposure detection circuitry configured to cause a first voltage for the first GPIO and a second voltage for the second GPIO to be measured, determine whether the first and second voltages each satisfy a threshold condition, and in response to determining that the first and second voltages each do not satisfy the threshold condition, cause operation of the USB-C receptacle to be suspended.

20 Claims, 11 Drawing Sheets

ARCHITECTURES FOR DETECTING USB TYPE-C DEVICE EXPOSURE TO LIQUIDS

TECHNICAL FIELD

This disclosure relates to integrated circuits (ICs) that control Universal Serial Bus (USB) power delivery to electronic devices, including architectures for detecting USB Type-C (USB-C) device exposure to liquids.

BACKGROUND

Various electronic devices (e.g., such as smartphones, tablets, notebook computers, laptop computers, hubs, chargers, adapters, etc.) are configured to transfer power through Universal Serial Bus (USB) connectors according to USB power delivery protocols defined in various revisions of the USB Power Delivery (USB-PD) specification. For example, in some applications, an electronic device may be configured as a power consumer to receive power through a USB connector (e.g., for battery charging). In contrast, in other applications, an electronic device may be configured as a power provider to provide power to another connected device through a USB connector.

BRIEF DESCRIPTION OF THE DRAWINGS

The disclosure is illustrated by way of example, and not of limitation, in the figures of the accompanying drawings.

DETAILED DESCRIPTION

Figures 1, 2:
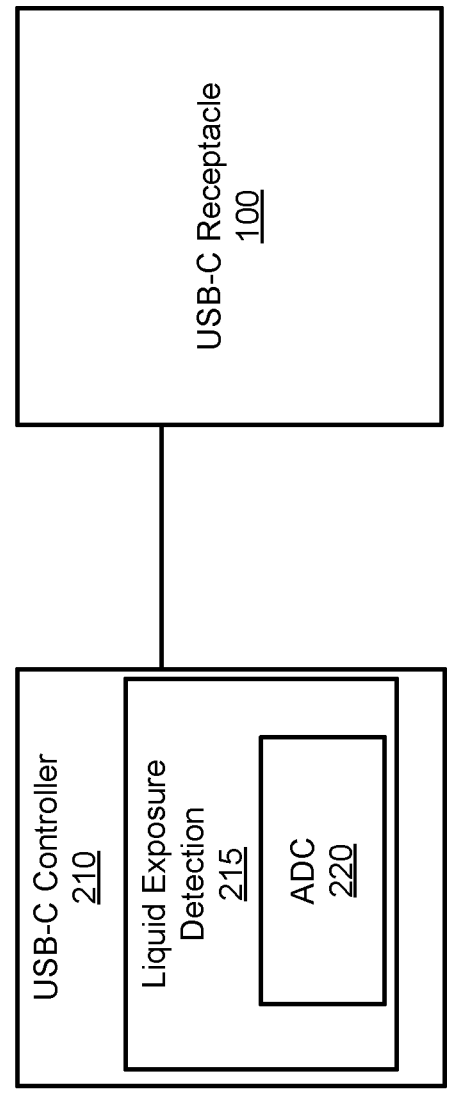
FIG. 1 is a block diagram of an example pinout of a USB type-C (USB-C) receptacle, in accordance with some embodiments.
FIG. 2 is a block diagram of a USB power delivery (USB-PD) device with an example architecture for detecting USB type-C (USB-C) receptacle exposure to liquids, in accordance with some embodiments.

The following description sets forth numerous specific details, such as examples of specific systems, components, methods, and so forth, in order to provide a good understanding of various embodiments of the techniques described herein for providing USB Type-C (USB-C) controller architectures for detecting USB-C receptacle exposure to liquids. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the invention. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples" are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

As used herein, a "USB-enabled" electronic device or system refers to a device or system that includes, is configured with, or is otherwise associated with a USB receptacle. Examples of such USB-enabled electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity and charging devices (e.g., hubs, docking stations, adapters, chargers, power banks, etc.), audio/video/data recording and/or playback devices (e.g., portable speakers, cameras, voice recorders, hand-held scanners, monitors, etc.), and other similar electronic devices that can use USB receptacles or USB plugs (i.e., connectors or interfaces) for communication, battery charging, and/or power delivery.

A USB-enabled electronic device may comply with at least one release of a USB specification. Examples of such USB specifications include, without limitation, the USB Specification Revision 2.0, the USB 3.0 Specification, the USB 3.1 Specification, the USB 3.2 Specification, and/or various supplements, versions, and errata thereof. The USB specifications generally define the characteristics (e.g., attributes, protocol definition, types of transactions, bus management, programming interfaces, etc.) of a differential serial bus that are required to design and build standard communication systems and peripherals. For example, a USB-enabled peripheral device attaches to a USB-enabled host device through a USB port of the host device to form a USB-enabled system. A USB 2.0 port includes a power voltage line (VBUS) (e.g., 5 V), a differential pair of data lines (denoted D+ or DP, and D− or DN), and a ground line for power return (denoted GND). DP/DN may employ additional sensing for battery charging and USB 2.0 high-speed signaling. A USB 3.0 port also provides the VBUS, D+, D−, and GND lines for backward compatibility with USB 2.0.

In addition, to support a faster differential bus (the USB SuperSpeed bus), a USB 3.0 port also provides a differential pair of transmitter data lines (denoted TX+ or TXP and TX− or TXN), a differential pair of receiver data lines (denoted RX+ or RXP and RX− or RXN), a power line for power (denoted DPWR), and a ground line for power return (denoted DGND). A USB 3.1 port provides the same lines as a USB 3.0 port for backward compatibility with USB 2.0 and USB 3.0 communications, but extends the performance of the SuperSpeed bus by a collection of features referred to as Enhanced SuperSpeed.

A more recent technology for USB connectors, called USB Type-C (also referred to herein as "USB-C"), is defined in various releases and/or versions of the USB-C specification. The USB-C specification defines a USB-C receptacle, USB-C plug, and USB-C connections (e.g., cables) that can support USB communications as well as power delivery over newer USB power delivery protocols defined in various revisions/versions of the USB-PD specification. Examples of USB-C functions and requirements may include, without limitation, data and other communications according to USB 2.0 and USB 3.0/3.1, electro-mechanical definitions and performance requirements for USB-C connections, electro-mechanical definitions and performance requirements for USB-C receptacles, electro-mechanical definitions and performance requirements for USB-C plugs, requirements for USB-C to legacy connection assemblies and adapters, requirements for USB-C-based device detection and interface configuration, requirements for optimized power delivery for USB-C connectors, etc.

A USB-C receptacle may be associated with a USB-C plug. For ease of use, the USB-C plug and the USB-C receptacle can be designed as a reversible pair that operates regardless of the plug-to-receptacle orientation. According to the USB-C specification(s), a USB-C receptacle and a USB-C plug each can provide VBUS, DP, DN, GND, TXP, TXN, RXP, and RXN lines, among others. In addition, a USB-C receptacle and a USB-C plug each also provide a sideband use (denoted SBU) line for signaling of sideband functionality and a configuration (or communication) channel (denoted CC) line for discovery, configuration, and management of connections across a USB-C connection. CC communication can allow for power delivery negotiation.

For example, a USB-C receptacle can include pins for four VBUS lines, four GND lines, two DP lines ($DP_1$ and $DP_2$), two DN lines ($DN_1$ and $DN_2$), two TXP lines ($TXP_1$ and $TXP_2$), two TXN lines ($TXN_1$ and $TXN_2$), two RXP lines ($RXP_1$ and $RXP_2$), two RXN lines ($RXN_1$ and $RXN_2$), two CC lines ($CC_1$ and $CC_2$), and two SBU lines ($SBU_1$ and $SBU_2$), among others.

As another example, a USB-C plug can include pins for four VBUS lines, four GND lines, one DP line (DP), one DN line (DN), two TXP lines ($TXP_1$ and $TXP_2$), two TXN lines ($TXN_1$ and $TXN_2$), two RXP lines ($RXP_1$ and $RXP_2$), two RXN lines ($RXN_1$ and $RXN_2$), one CC line (CC), one $V_{CONN}$ line ($V_{CONN}$) and two SBU lines ($SBU_1$ and $SBU_2$), among others. $V_{CONN}$ is a power supply used to power a device (e.g., integrated circuit (IC)) within a USB-C connection, such as an electronically marked cable assembly (EMCA) USB-C cable. Accordingly, $V_{CONN}$ may supply power to USB-C controller ICs in active cables or adaptors.

Some USB-enabled electronic devices, such as USB-C-enabled electronic devices, may comply with a specific revision and/or version of the USB-PD specification. The USB-PD specification defines a standard protocol designed to enable the maximum functionality of USB-enabled devices by providing more flexible power delivery along with data communications over a single USB-C cable through USB-C ports. The USB-PD specification also describes the architecture, protocols, power supply behavior, parameters, and cabling necessary for managing power delivery over USB-C cables at up to at least 240 W of power. According to the USB-PD specification, devices with USB-C ports (e.g., such as USB-enabled devices) may negotiate for more current and/or higher or lower voltages over a USB-C cable than are allowed in older USB specifications (e.g., such as the USB 2.0 Specification, USB 3.1 Specification, the USB Battery Charging Specification Rev. 1.1/1.2, etc.). For example, the USB-PD specification defines the requirements for a power delivery contract (PD contract) that can be negotiated between a pair of USB-enabled devices. The PD contract can specify both the power level and the direction of power transfer that both devices can accommodate, and can be dynamically re-negotiated (e.g., without device un-plugging) upon request by either device and/or in response to various events and conditions, such as power role swap, fast role swap, data role swap, hard reset, failure of the power source, etc. As used herein, "USB-PD subsystem" refers to one or more logic blocks and other analog/digital hardware circuitry, which may be controllable by firmware in an IC controller and which is configured and operable to perform the functions and to satisfy the requirements specified in at least one release of the USB-PD specification. The IC controller can be implemented in a USB-C device. The IC controller can be implemented in a USB device.

Power delivery in accordance with the USB-PD specification(s) can be embodied in several different types of USB-C applications. Examples of such types of USB-C applications include, but may not be limited to: a downstream facing port (DFP) application, in which an integrated circuit (IC) controller with a USB-PD subsystem is configured to provide a downstream-facing USB-C port (e.g., in a USB-enabled host device); an upstream facing port (UFP) application, in which an IC controller with a USB-PD subsystem is configured to provide an upstream-facing USB-C port (e.g., in a USB-enabled peripheral device or adapter); a dual role port (DRP) USB application, in which an IC controller with a USB-PD subsystem is configured to support both DFP and UFP applications on the same USB-C port (e.g., a USB-C port that is configured to operate as either a power provider or a power consumer or can alternate between these two roles dynamically by using USB-PD power role swap); and an active cable application, in which an IC controller with a USB-PD subsystem is disposed into, and configured to operate a USB-C connection, such as an EMCA USB-C cable.

USB-enabled electronic devices, such as USB-C enabled electronic devices, can be exposed to liquids. Examples of liquids include water, oil, etc. Illustratively, a USB-enabled electronic device can be dropped in water. Liquid exposure can trigger a false detection of a USB-C connection. Proper detection can allow VBUS to be turned off in the presence of a liquid, which can result in the corrosion of a USB-C port and can damage such devices.

In some systems, detecting exposure to liquids can be performed using a CC pin and/or an SBU pin of a USB-C device (e.g., USB-C receptacle or USB-C plug). However, by utilizing a CC pin and/or an SBU pin, some functions enabled by the CC pin and/or the SBU pin can be lost. This can also result in the corrosion of the USB-C device as voltage may be applied on CC and or the SBU pin continuously to detect the moisture presence.

Aspects of the present disclosure address the deficiencies described above and other challenges by providing architectures for detecting USB-C device exposure to liquids. Examples of liquids include water, oil, etc. An architecture described herein can include a USB-C controller. In some embodiments, the USB-C controller includes a microcontroller unit (MCU). Illustratively, a first general-purpose input/output (GPIO) pin can be connected to an external pull-up resistor (R1) having a first resistance, and a second GPIO pin of the pair can be connected to an external pull-down resistor (R2) having a second resistance. In some implementations, R1 can have a resistance of about 4.7 kiloohms (kΩ), and R2 can have a resistance of about 100 kΩ. In the absence of water, the magnitude of the voltage for the first GPIO pin ($V_1$) will be approximately equal to a supply voltage (e.g., about 3.3 V), and the magnitude of the voltage for the second GPIO pin ($V_2$) will be close to ground (e.g., about 0 V). The presence of water can result in a resistive path between the pair of GPIO pins, which may cause a change to V1 and/or V2. The change can be detected using the ADC, which indicates the presence of water. The resistance can vary depending on the type of liquid. For example, the presence of salt water can result in a resistance on the order of 10 kΩ, while the presence of non-salt water (e.g., tap water or distilled water) can result in a resistance on the order of 100 kΩ.

A USB-C controller described herein can include an ADC, a plurality of GPIO pins, and at least one internal multiplexer (MUX). The at least one internal MUX can selectively form connections between a pair of GPIO pins of the plurality of GPIO pins, and other non-GPIO pins of the USB-C controller.

In some embodiments, the USB-C controller is coupled to control a USB-C receptacle. For example, the plurality of GPIO pins of the USB-C controller can include a first pair of GPIO pins, including a $GPIO_1$ pin and a $GPIO_2$ pin, and a second pair of GPIO pins, including a $GPIO_3$ pin and a $GPIO_4$ pin. The USB-C controller can further include a pair of $DP_1/DN_1$ pins and a pair of $DP_2/DN_2$ pins each corresponding to a respective one of the pair of $DP_1/DN_1$ pins and a pair of $DP_2/DN_2$ pins of the USB-C receptacle. The USB-C controller can further include a pair of $SBU_1/SBU_2$ pins corresponding to the pair of $SBU_1/SBU_2$ pins of the USB-C receptacle. The at least one internal MUX can include a first internal MUX through which the USB-C controller can periodically connect a pair of DP/DN pins (e.g., the pair of $DP_1/DN_1$ pins or the pair of $DP_2/DN_2$ pins) to the first pair of GPIO pins. The at least one internal MUX can further include a second internal MUX through which the USB-C controller can selectively connect its $SBU_1/SBU_2$ pins through the second internal MUX to the second pair of GPIO pins.

A first external device (e.g., full speed or high-speed device) configured to be connected to the USB-C receptacle can present a pull-up resistance on one of its system data line pins (e.g., $DP_{SYS}$ pin), and a second external device (e.g., host device) can present a pull-down resistance on both of its system data line pins (i.e., the $DP_{SYS}$ pin and the $DN_{SYS}$ pins). For example, the pull-up resistance can be about 1.5 KΩ and the pull-down resistance can be about 15 KΩ. As a result, when the external device is connected to a USB-C receptacle, only the voltage on the $DP_{SYS}$ pin may change. Moreover, only one pair of DP/DN pins of the USB-C receptacle may be active (i.e., the pair of $DP_1/DN_1$ pins or the pair of $DP_2/DN_2$ pins). That is, both pairs of DP/DN pins of the USB-C receptacle will not be simultaneously active. Thus, in a USB-C receptacle, any voltage change on both pairs of DP/DN pins can indicate exposure to a liquid.

Embodiments described herein can be used to detect the presence of liquid on a USB-C receptacle by analyzing voltage changes across a pair of pins using the at least one internal MUX. In some embodiments, the first internal MUX is used to detect voltage changes across a pair of DP/DN pins (i.e., $DP_1/DN_1$ or $DP_2/DN_2$). More specifically, the first internal MUX can connect the pair of DP/DN pins (i.e., $DP_1/DN_1$ and/or $DP_2/DN_2$) from the USB-C port to the first pair of GPIO pins (i.e., $GPIO_1$ and $GPIO_2$).

The USB-C controller can use the ADC to measure a voltage on each of the $GPIO_1$ pin and the $GPIO_2$ pin. The USB-C controller can determine whether the voltage on each of the $GPIO_1$ pin and the $GPIO_2$ pin satisfies a threshold voltage condition. For example, determining whether the voltage on each of the $GPIO_1$ pin and the $GPIO_2$ pin satisfies the threshold condition can include determining whether a first voltage measured on the $GPIO_1$ pin is greater than a first threshold voltage, and determining whether a second voltage measured on the $GPIO_2$ pin is less than a second threshold voltage. In some embodiments, the first threshold voltage is about 3.2 V and the second threshold voltage is about 0.1 V. If the voltage on each of the $GPIO_1$ pin and the $GPIO_2$ pin satisfies the threshold condition, this means that there is no presence of a liquid on the USB-C receptacle. Otherwise, if the voltage on each of the $GPIO_1$ pin and the $GPIO_2$ pin does not satisfy the threshold condition, this means that there may be a liquid present on the USB-C receptacle. Thus, in response to determining that the voltage on each of the $GPIO_1$ pin and the $GPIO_2$ pin does not satisfy the threshold condition, the USB-C controller can cause the USB-C receptacle to enter a suspended state. After causing the USB-C receptacle to enter the suspended state, the USB-C controller can determine whether the liquid is present on the USB-C receptacle by continuing to scan the USB-C receptacle (e.g., periodically scanning the USB-C receptacle). If the USB-C controller determines that there is still liquid present on the USB-C receptacle, then the USB-C controller can continue scanning the USB-C receptacle. Otherwise, if the USB-C controller determines that liquid is no longer present on the USB-C receptacle (i.e., the amount of liquid is undetectable), then the USB-C controller can remove the suspend and enable the USB-C port to connect to an external device. More specifically, the USB-C controller can receive or provide power to the external device, and connect the active pair of DP/DN pins of the USB-C receptacle to the pair of $DP_{SYS}/DN_{SYS}$ pins of the external device. In some embodiments, the external device is a host device (e.g., a USB host device).

In some embodiments, the second internal MUX is used to detect voltage changes across a pair of SBU pins (i.e., $SBU_1$ and $SBU_2$). More specifically, the second internal MUX can connect the pair of SBU pins to the second pair of GPIO pins (i.e., $GPIO_3$ and $GPIO_4$). Then, using the ADC, the USB-C controller can measure a voltage on each of the $GPIO_3$ pin and the $GPIO_4$ pin. The USB-C controller can determine whether the voltage on each of the $GPIO_3$ pin and the $GPIO_4$ pin satisfies a threshold voltage condition. For example, determining whether the voltage on each of the GPIO$_3$ pin and the GPIO$_4$ pin satisfies the threshold condition can include determining whether a first voltage measured on the GPIO$_3$ pin is greater than a first threshold voltage, and determining whether a second voltage measured on the GPIO$_4$ pin is less than a second threshold voltage. In some embodiments, the first threshold voltage is about 3.2 V and the second threshold voltage is about 0.1 V. If the voltage on each of the GPIO$_3$ pin and the GPIO$_4$ pin satisfies the threshold condition, this means that there is no presence of a liquid on the USB-C receptacle. Otherwise, if the voltage on each of the GPIO$_3$ pin and the GPIO$_4$ pin does not satisfy the threshold condition, this means that there may be a liquid present on the USB-C receptacle. Thus, in response to determining that the voltage on each of the GPIO$_3$ pin and the GPIO$_4$ pin does not satisfy the threshold condition, the USB-C controller can cause the USB-C receptacle to enter a suspended state. After causing the USB-C receptacle to enter the suspended state, the USB-C controller can determine whether the liquid is present on the USB-C receptacle by scanning the USB-C receptacle (e.g., periodically scanning the USB-C receptacle). If the USB-C controller determines that there is still liquid present on the USB-C receptacle, then the USB-C controller can continue scanning the USB-C receptacle. Otherwise, if the USB-C controller determines that liquid is no longer present on the USB-C receptacle (i.e., the amount of liquid is undetectable), then the USB-C controller can remove the suspend and enable the USB-C port to connect to an external device. More specifically, the USB-C controller can receive or provide power to the external device, and connect the active pair of SBU pins to a pair of auxiliary line pins (pair of AUX$_P$/AUX$_N$ pins). In some embodiments, the external device is an external controller. For example, the external controller can be a Display Port (DP) controller implementing a DP communication protocol or a Thunderbolt® (TBT) controller implementing a TBT communication protocol. Further details regarding these embodiments will be described below with reference to FIGS. 2-3.

In some embodiments, the USB-C controller does not include the at least one internal MUX. Thus, at least one external MUX can be operatively coupled to at least one external device, the USB-C controller and the USB-C receptacle. The at least one external MUX can be controlled by the USB-C controller using GPIO/FC (Inter-Integrated Circuit communications protocol).

In some embodiments, the at least one external MUX includes a first external MUX operatively coupled to the first external device (e.g., a host device), the USB-C controller, and the USB-C receptacle. For example, the first external MUX can be a 2×1 MUX configured to connect a pair of DP/DN pins (i.e., DP$_1$/DN$_1$ or DP$_2$/DN$_2$) to either (1) a pair of DP$_{SYS}$/DN$_{SYS}$ pins of the first external device, or (2) the first pair of GPIO pins (i.e., GPIO$_1$/GPIO$_2$) to measure the voltage of the pair of DP/DN pins for liquid exposure detection. Further details regarding this embodiment will be described below with reference to FIG. 4A. As another example, the first external MUX can be a 2×2 MUX configured to connect the pair of DP/DN pins to the pair of DP$_{SYS}$/DN$_{SYS}$ pins of the first external device and the first pair of GPIO pins to measure the voltage of the pair of DP/DN pins for liquid exposure detection. Further details regarding these embodiments will be described below with reference to FIG. 4B.

In some embodiments, the at least one external MUX includes a second external MUX operatively coupled to the second external device (e.g., external controller), the USB-C controller, and the USB-C receptacle. For example, the second external MUX can be a 2×1 MUX configured to connect the pair of SBU pins (i.e., SBU$_1$ and SBU$_2$) to either (1) the pair of AUX$_P$/AUX$_N$ pins of the external controller, or (2) the second pair of GPIO pins (i.e., GPIO$_3$/GPIO$_4$) to measure the voltage of the pair of DP/DN pins for liquid exposure detection. Further details regarding these embodiments will be described below with reference to FIG. 4C.

In some embodiments, the USB-C controller is coupled to control a USB-C plug. The plurality of GPIO pins of the USB-C controller can similarly include the first pair of GPIO pins and the second pair of GPIO pins, including a GPIO$_3$ pin and a GPIO$_4$ pin. The USB-C controller can further include a pair of DP/DN pins corresponding to the pair of DP/DN pins of the USB-C plug. The USB-C controller can further include a pair of SBU$_1$/SBU$_2$ pins corresponding to the pair of SBU$_1$/SBU$_2$ pins of the USB-C plug. The at least one internal MUX can include a first internal MUX through which the USB-C controller can periodically connect the pair of DP/DN pins to the first pair of GPIO pins. The at least one internal MUX can further include a second internal MUX through which the USB-C controller can selectively connect its SBU$_1$/SBU$_2$ pins through the second internal MUX to the second pair of GPIO pins.

A first external device (e.g., full speed or high-speed device) configured to be connected to the USB-C plug can present a pull-up resistance on one of its system data line pins (e.g., DP$_{SYS}$ pin), and a second external device (e.g., host device) can present a pull-down resistance on both of its system data line pins (i.e., the DP$_{SYS}$ pin and the DN$_{SYS}$ pins). For example, the pull-up resistance can be about 1.5 KS/and the pull-down resistance can be about 15 KΩ. As a result, when the USB-C plug is connected to the first external device, there won't be any change to the DP/DN voltage. Similarly, when the USB-C plug is connected to the second external device, only the voltage on the DP$_{SYS}$ pin may change and the voltage on the DN$_{SYS}$ pin may be 0 V. Thus, these parameters can be used to differentiate between an actual connection between an external device and a USB-C plug, and exposure of the USB-C plug to a liquid.

Embodiments described herein can be used to detect the presence of liquid on a USB-C plug by analyzing voltage changes across a pair of pins using the at least one internal MUX. In some embodiments, the first internal MUX is used to detect voltage changes across the pair of DP/DN pins. More specifically, the first internal MUX can connect the pair of DP/DN pins from the USB-C port to the first pair of GPIO pins (i.e., GPIO$_1$ and GPIO$_2$). The USB-C controller can use the ADC to measure a voltage on each of the GPIO$_1$ pin and the GPIO$_2$ pin. The USB-C controller can determine whether the voltage on each of the GPIO$_1$ pin and the GPIO$_2$ pin satisfies a threshold voltage condition. For example, determining whether the voltage on each of the GPIO$_1$ pin and the GPIO$_2$ pin satisfies the threshold condition can include determining whether a first voltage measured on the GPIO$_1$ pin is greater than a first threshold voltage, and determining whether a second voltage measured on the GPIO$_2$ pin is less than a second threshold voltage. In some embodiments, the first threshold voltage is about 3.2 V and the second threshold voltage is about 0.1 V. If the voltage on each of the GPIO$_1$ pin and the GPIO$_2$ pin satisfies the threshold condition, this means that there is no presence of a liquid on the USB-C plug. Otherwise, if the voltage on each of the GPIO$_1$ pin and the GPIO$_2$ pin does not satisfy the threshold condition, this means that there may be a liquid present on the USB-C plug. Thus, in response to determining that the voltage on each of the GPIO$_1$ pin and the GPIO$_2$ pin does not satisfy the threshold condition, the USB-C controller can cause the USB-C plug to enter a suspended state. After causing the USB-C plug to enter the suspended state, the USB-C controller can determine whether the liquid is present on the USB-C plug by continuing to scan the USB-C plug (e.g., periodically scanning the USB-C plug). If the USB-C controller determines that there is still liquid present on the USB-C plug, then the USB-C controller can continue scanning the USB-C plug. Otherwise, if the USB-C controller determines that liquid is no longer present on the USB-C plug (i.e., the amount of liquid is undetectable), then the USB-C controller can remove the suspend and enable the USB-C port to connect to an external device. More specifically, the USB-C controller can receive or provide power to the external device, and connect the pair of DP/DN pins of the USB-C plug to the pair of $DP_{SYS}/DN_{SYS}$ pins of the external device. In some embodiments, the external device is a host device (e.g., a USB host device).

In some embodiments, the second internal MUX is used to detect voltage changes across a pair of SBU pins (i.e., $SBU_1$ and $SBU_2$). More specifically, the second internal MUX can connect the pair of SBU pins to the second pair of GPIO pins (i.e., $GPIO_3$ and $GPIO_4$). Using the ADC, the USB-C controller can measure a voltage on each of the $GPIO_3$ pin and the $GPIO_4$ pin. The USB-C controller can determine whether the voltage on each of the $GPIO_3$ pin and the $GPIO_4$ pin satisfies a threshold voltage condition. For example, determining whether the voltage on each of the $GPIO_3$ pin and the $GPIO_4$ pin satisfies the threshold condition can include determining whether a first voltage measured on the $GPIO_3$ pin is greater than a first threshold voltage, and determining whether a second voltage measured on the $GPIO_4$ pin is less than a second threshold voltage. In some embodiments, the first threshold voltage is about 3.2 V and the second threshold voltage is about 0.1 V. If the voltage on each of the $GPIO_3$ pin and the $GPIO_4$ pin satisfies the threshold condition, this means that there is no presence of a liquid on the USB-C plug. Otherwise, if the voltage on each of the $GPIO_3$ pin and the $GPIO_4$ pin does not satisfy the threshold condition, this means that there may be a liquid present on the USB-C plug. Thus, in response to determining that the voltage on each of the $GPIO_3$ pin and the $GPIO_4$ pin does not satisfy the threshold condition, the USB-C controller can cause the USB-C plug to enter a suspended state. After causing the USB-C plug to enter the suspended state, the USB-C controller can determine whether the liquid is present on the USB-C plug by scanning the USB-C plug (e.g., periodically scanning the USB-C plug). If the USB-C controller determines that there is still liquid present on the USB-C plug, then the USB-C controller can continue scanning the USB-C plug. Otherwise, if the USB-C controller determines that liquid is no longer present on the USB-C plug (i.e., the amount of liquid is undetectable), then the USB-C controller can remove the suspend and enable the USB-C port to connect to an external device. More specifically, the USB-C controller can receive or provide power to the external device, and connect the active pair of SBU pins to a pair of auxiliary line pins (pair of $AUX_P/AUX_N$ pins). In some embodiments, the external device is an external controller. For example, the external controller can be a DP controller implementing a DP communication protocol or a TBT controller implementing a TBT communication protocol. Further details regarding these embodiments will be described below with reference to FIGS. 6-7.

In some embodiments, the USB-C controller does not include the at least one internal MUX. Thus, at least one external MUX can be operatively coupled to at least one external device, the USB-C controller and the USB-C plug. The at least one external MUX can be controlled by the USB-C controller using GPIO/I²C (Inter-Integrated Circuit communications protocol).

In some embodiments, the at least one external MUX includes a first external MUX operatively coupled to the first external device (e.g., a host device), the USB-C controller, and the USB-C receptacle. For example, the first external MUX can be a 2×1 MUX configured to connect the pair of DP/DN pins to either (1) a pair of $DP_{SYS}/DN_{SYS}$ pins of the first external device, or (2) the first pair of GPIO pins (i.e., $GPIO_1/GPIO_2$) to measure the voltage of the pair of DP/DN pins for liquid exposure detection. Further details regarding these embodiments will be described below with reference to FIG. 8A.

In some embodiments, the at least one external MUX includes a second external MUX operatively coupled to the second external device (e.g., external controller), the USB-C controller, and the USB-C receptacle. For example, the second external MUX can be a 2×1 MUX configured to connect the pair of SBU pins (i.e., $SBU_1$ and $SBU_2$) to either (1) the pair of $AUX_P/AUX_N$ pins of the external controller, or (2) the second pair of GPIO pins (i.e., $GPIO_3/GPIO_4$) to measure the voltage of the pair of DP/DN pins for liquid exposure detection. Further details regarding these embodiments will be described below with reference to FIG. 8B.

FIG. 1 is a block diagram of a USB-C receptacle 100, according to some embodiments. The USB-C receptacle 100 includes a plurality of pins. Many of the pins of the USB-C receptacle 100 are replicated on the top and the bottom so that a USB-C connector may reversibly fit into a USB-C receptacle 100.

For example, as shown, the pins can include GND pins 102-1 through 102-4, $TXP_1$ pin 104-1, $TXP_2$ pin 104-2, $RXP_1$ pin 106-1, $RXP_2$ pin 106-2, $TXN_1$ pin 108-1, $TXN_2$ pin 108-2, $RXN_1$ pin 110-1, $RXN_2$ pin 110-2, VBUS pins 112-1 through 112-4, $CC_1$ pin 114-1, $CC_2$ pin 114-2, $SBU_1$ pin 116-1, $SBU_2$ pin 116-2, $DP_1$ pin 118-1, $DP_2$ pin 118-2, $DN_1$ pin 120-1, and $DN_2$ pin 120-2.

The CC pins 114-1 and 114-2 may enable cable-attached detection, cable orientation detection, role detection, and current-mode detection, e.g., standard mode or alternate mode. An unused one of the CC pins 114-1 or 114-2 may become the $V_{CONN}$ pin. The VBUS pins 112-1 through 112-4 may be used for the cable bus power and the GND pin for the cable ground. The SBU pins 116-1 and 116-2 may be for communicating with other-than-USB protocols in alternate modes, such as with the DP protocol, high-definition multimedia interface (HDMI) protocol, the TBT protocol, the mobile high-definition link (MHL) protocol, and the Peripheral Component Interconnect Express (PCIe) protocol, and the like.

$DP_1$ pin 118-1 and $DN_1$ pin 120-1 can be referred to as "top DP/DN pins," and $DP_2$ pin 118-2 and $DN_2$ pin 120-2 can be referred to as "bottom DP/DN pins." The position of each of the DP pins 118-1 and 118-2 may be flipped between the top and the bottom of the USB-C receptacle 100. This is due to the USB-C specification definition of a USB-C port, which may be associated with a USB-C plug. For ease of use, the USB-C plug and the USB-C receptacle 100 are designed as a reversible pair that operates regardless of the plug-to-receptacle orientation. Accordingly, as will be described below with reference to FIGS. 2-3, a USB-C controller may include multiplexing between top and bottom duplicate pins depending on the orientation of the USB-C plug placed therein during operation. Further, a signal may be transmitted through either of the CC pins 114-1 or 114-2, which may follow CC protocol for flip correction so as to signal the multiplexers which set of pins to select, as will be discussed in detail.

FIG. 2 is a block diagram of a USB-PD device 200, in accordance with some embodiments. The USB-PD device 200 can be implemented as a serial bus-compatible power supply device. An example of a serial bus-compatible power supply device may include a serial bus power delivery (SBPD) device, a USB-compatible power supply device, or the like. In some embodiments, the USB-PD device 200 is a multi-port USB-PD device compatible with the USB-PD standard or, more generally, with the USB standard. For example, the USB-PD device 200 may provide an output voltage (e.g., VBUS_C, power supply voltage) based on an input voltage (e.g., VBUS IN, power supply voltage) on each of the multiple ports. The USB-PD device 200 may facilitate communications between a primary-side controller and a secondary-side controller. The USB-PD device 200 may include a power converter (e.g., an AC-DC converter) and a power control analog subsystem (e.g., a USB-PD controller). The power control analog subsystem may include the circuitry, functionality, or both, as described herein for communicating information across a galvanic isolation barrier.

In some embodiments, the USB-PD device 200 is connected to a power source, such as a wall socket power source that provides AC power. In other embodiments, the power source may be a different power source, such as a vehicle battery, and may provide DC power to the USB-PD device 200. The power converter may convert the power received from a power source (e.g., convert power received from VBUS IN, ranging from 3.3V to 21.5V). For example, a power converter may be an AC-DC converter and convert AC power from the power source to DC power. In some embodiments, the power converter is a flyback converter, such as a secondary-controlled flyback converter, that provides galvanic isolation between the input (e.g., primary side) and the output (e.g., secondary side). The USB-PD device 200 can provide power to an external device. In some embodiments, the external device is a consumer device. The external device may control the gate-source voltage of its provider FET with a secondary gate driver integrated onto the secondary-side controller of the external device.

In some embodiments, the USB-PD device 200 provides VBUS_C to a sink device (e.g., by using a Configuration Channel (CC) to negotiate a PD contract that specifies a particular output voltage and possibly an output current). The USB-PD device 200 may also provide access to ground potential (e.g., ground) to the sink device. In some embodiments, the providing of the VBUS_C is compatible with the USB-PD standard. The power control analog subsystem in a USB-PD device may receive VBUS IN from the power converter, and the power control analog subsystem may output VBUS IN. The power control analog subsystem may be included in (or as) a USB Type-C controller compatible with the USB Type-C standard in some embodiments. The power control analog subsystem may provide system interrupts responsive to the VBUS IN and the VBUS_C.

In some embodiments, any of the components of the USB-PD device 200 may be part of an IC, or alternatively, any of the components of the USB-PD device 200 may be implemented in its own IC. For example, the power converter and the power control analog subsystem may be discrete ICs with separate packaging and pin configurations.

In some embodiments, the USB-PD device 200 may provide a complete USB Type-C and USB-Power Delivery port control solution for notebooks, dongles, monitors, docking stations, power adapters, vehicle chargers, power banks, mobile adaptors, and the like.

The USB-PD device 200 includes a USB-C controller 210 operatively coupled to USB-C receptacle 100. The USB-C controller 210 may be disposed in a chip package and can include liquid exposure detection circuitry 215 configured to detect exposure of the USB-C receptacle 100 to liquids, in accordance with the techniques described herein. For example, the liquid exposure detection circuitry 215 can include an ADC 220. The USB-C controller 210 is configured to negotiate a PD contract with the external device, which can be attached to the USB-C receptacle 100, and controlled through an output pin with the required VBUS voltage. The USB-C receptacle 100 can also be referred to as a USB-C connector and is typically associated with a USB-C plug, but it should be understood that in various embodiments, the USB-C receptacle 100 may be associated with a USB-C port instead. Further details regarding the USB-C controller 210, the liquid exposure detection circuitry 215 including the ADC 220, and the USB-C receptacle 100 will now be described below with reference to FIG. 3.

Figure 3:
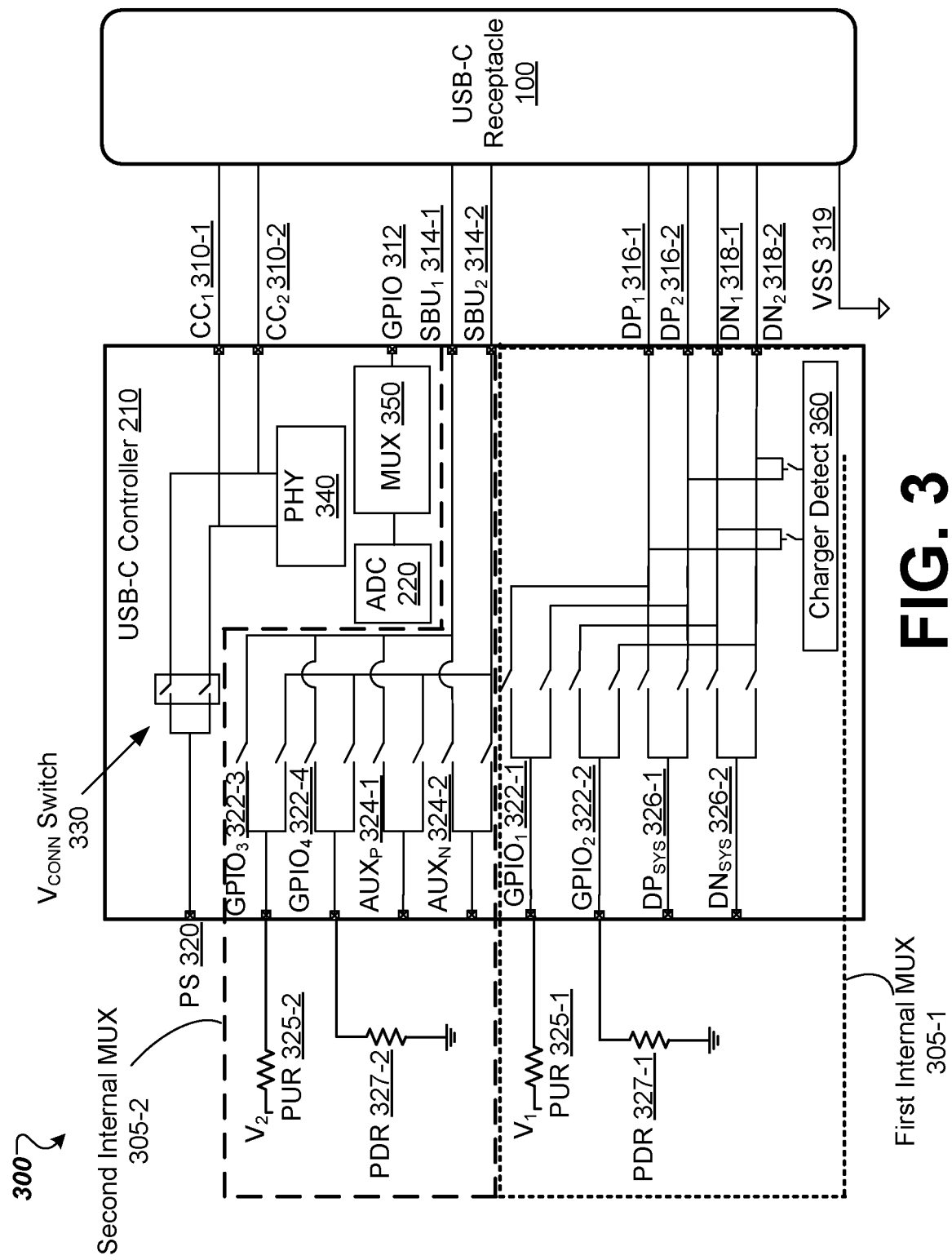
FIG. 3 is a block diagram of an example USB power delivery (USB-PD) device with an example architecture for detecting USB type-C (USB-C) receptacle exposure to liquids, in accordance with some embodiments.

FIG. 3 is a block diagram of an example USB-PD device 300, in accordance with some embodiments. As shown, the USB-PD device 300 includes the USB-C controller 210 and the USB-C receptacle 100.

The USB-C controller 210 can include a first port. For example, the first port can include a $CC_1$ pin 310-1 connected to a $CC_1$ pin of the USB-C receptacle 100 (e.g., $CC_1$ pin 114-1 of FIG. 1), a $CC_2$ pin 310-2 connected to a $CC_2$ pin of the USB-C receptacle 100 (e.g., $CC_1$ pin 114-2 of FIG. 1), a GPIO pin 312, an $SBU_1$ pin 314-1 connected to an $SBU_1$ pin of the USB-C receptacle 100 (e.g., $SBU_1$ pin 116-1 of FIG. 1), an $SBU_2$ pin 314-2 connected to an $SBU_2$ pin of the USB-C receptacle 100 (e.g., $SBU_2$ pin 116-2 of FIG. 1), a $DP_1$ pin 316-1 connected to a $DP_1$ pin of the USB-C receptacle 100 (e.g., $DP_1$ pin 118-1 of FIG. 1), a $DP_2$ pin 316-2 connected to a $DP_2$ pin of the USB-C receptacle 100 (e.g., $DP_1$ pin 118-2 of FIG. 1), a $DN_1$ pin 318-1 connected to a $DN_1$ pin of the USB-C receptacle 100 (e.g., $DN_1$ pin 120-1 of FIG. 1), and a $DN_2$ pin 318-2 connected to a $DN_1$ pin of the USB-C receptacle 100 (e.g., $DN_2$ pin 120-2 of FIG. 1).

The GPIO pin 312 can be associated with a plurality of GPIOs. In some embodiments, the GPIO pin 312 is associated with 13 GPIOs. The SBU pins 314-1 and 314-2 may be used to establish communications with other-than-USB protocols in alternate modes, such as with the DP protocol, high-definition multimedia interface (HDMI) protocol, the TBT protocol, the mobile high-definition link (MHL) protocol, the Peripheral Component Interconnect Express (PCIe) protocol, etc.

The USB-C controller 210 can further include a second port. For example, the second port can include a power supply (PS) pin 320, a first pair of GPIO pins including $GPIO_1$ pin 322-1 and $GPIO_2$ pin 322-2, a second pair of GPIO pins including $GPIO_3$ pin 322-3 and $GPIO_4$ pin 322-4, $AUX_P$ pin 324-1, $AUX_N$ pin 324-2, $DP_{SYS}$ pin 326-1 and $DP_{SYS}$ pin 326-1. $GPIO_1$ pin 322-1 can be connected to one end of a pull-up resistor (PUR) 325-1 and $GPIO_2$ pin 322-2 can be connected to one end of a pull-down resistor (PDR) 327-1. $GPIO_3$ pin 322-3 can be connected to one end of a PUR 325-2 and $GPIO_4$ pin 322-4 can be connected to one end of a PDR 327-2. A voltage source providing voltage $V_1$ can be connected to the other end of PUR 325-1 and a voltage source providing voltage $V_2$ can be connected to the other end PUR 325-2. In some embodiments, $V_1$ and $V_2$ are each about 3.3 V. The other ends of PDRs 327-1 and 327-2 can each be connected to GND (e.g., 0 V).

The PS pin 320 is connected to the $CC_1$ and $CC_2$ pins 310-1 and 310-2 for providing an input to power USB-C cables (e.g., EMCA cables). For example, the input can range between about 4.85 V to about 5.5 V. The $AUX_P$ pin 324-1 and the $AUX_N$ pin 324-2 can provide auxiliary signals for DP protocol signaling. USB-C receptacle 100 can be connected to a VSS pin 319 (e.g., GND).

The USB-C controller 210 can further include a $V_{CONN}$ switch 330 and a physical interface (PHY) 340, each connected to the $CC_1$ and $CC_2$ pins 310-1 and 310-2. The $V_{CONN}$ switch 330 can control which of the $CC_1$ or $CC_2$ pins 310-1 or 310-2 is being used. The unused one of the $CC_1$ or $CC_2$ pins 310-1 or 310-2 may be designated as a $V_{CONN}$ pin, which may supply power to USB-C controller chips in active cables or adaptors. PHY 340 supports CC communications and can operate at the same ground potential as the USB-C receptacle 100. For example, PHY 340 can include a transmitter and a receiver that communicates using a low-level coding scheme over the CC channel. For example, PHY 340 can communicate using biphase mark coding (BMC) and 4 b/5 b encoded/decoded data over the CC channel based on the PD 3.0 specification. The communication can be half-duplex communication. PHY 340 can practice collision avoidance to minimize communication errors on the channel.

The USB-C controller 210 can further include an ADC 220 operatively coupled to a MUX bus 350. More specifically, the MUX bus 350 can be an analog MUX bus. For example, the ADC 220 can be a successive-approximate register ADC (SAR ADC). In some embodiments, the ADC 220 is an 8-bit ADC, including an 8-bit digital-to-analog converter (DAC) and a comparator. The output of the DAC can form the positive input of the comparator. The negative input of the comparator can be received from the MUX bus 350. The GPIO pins of the USB-C controller 210 have access to the ADC 220 through the MUX bus 350. The $CC_1$ pin 310-1 and the $CC_2$ pin 310-2 are not available to connect to the MUX bus 350. In some embodiments, the MUX bus 350 is an analog MUX (AMUX) bus that can connect zero, one, or more analog signals to a different common analog signal. For example, the MUX bus 350 can be used to connect more than one analog signal at a time to provide crossbar switch support.

The USB-C controller 210 can include a first internal MUX 305-1. The first internal MUX 305-1 can be referred to as a "USB 2.0 MUX." More specifically, the first internal MUX 305-1 can be a high-speed (HS) USB 2.0 MUX. The first internal MUX 305-1 can be a 2×2 MUX, including a 2×2 crossbar switch to route the $DP_{SYS}$ and $DN_{SYS}$ lines of the USB-C controller 210 to the USB-C top or bottom port based on the CC (USB-C plug) orientation. The unused DP/DN top or bottom lines can be connected to a debug port. The first internal MUX 305-1 can be configured to selectively connect at least one of the DP/DN pins of the USB-C controller 210 (e.g., at least one of $DP_1$ 316-1, $DP_2$ 316-2, $DN_1$ 318-1 or $DN_2$ 318-2) to either (1) at least one of the system DP/DN pins of the USB-C controller 210 (i.e., at least one the $DP_{SYS}$ pin 326-1 or the $DN_{SYS}$ pin 326-2) or (2) at least one GPIO pin of the first pair of GPIO pins of the USB-C controller 210 (i.e., at least one of $GPIO_1$ pin 322-2 or $GPIO_2$ pin 322-2).

The first internal MUX 305-1 can further include a charger detect circuit 360 for determining that a charging circuit is present. The charger detector circuit 360 may detect whether an external device, through the USB-C receptacle 100, includes a USB charger and thus contains a battery to be charged rather than connected for high-speed data transfer. The charger detector circuit 360 may include a first switch coupled to the $DP_{SYS}$ pin 326-1 and a second switch coupled to the $DN_{SYS}$ pin 326-2 to facilitate the selective coupling just referenced. In some embodiments, the first and second switches are controllable by logic (e.g., firmware, state machine, or other logic) to disconnect the charger detector circuit 360 during high-speed data transfer of the USB-C controller, which reduces the battery charging capacitive load on the lines connected to the DP/DN pins and maintains better signal integrity. In various embodiments, after the charger detector circuit 360 detects whether to perform charging or high-speed data transfer, the charger detector circuit 360 may open the first and second switches to disconnect the charger detector circuit 360. Alternatively, the charger detector circuit 360 may be disconnected after a set time window or upon a predetermined signal from the logic.

The USB-C controller 210 can further include a second internal MUX 305-2. The second internal MUX 305-2 can be referred to as an "SBU MUX." The second internal MUX 305-2 can be a 4×2 MUX configured to selectively connect the SBU pins of the USB-C receptacle 100 (e.g., $SBU_1$ pin 116-1 and $SBU_2$ pin 116-2 of FIG. 1) to either (1) at least one pin of an external device (e.g., host device or display device) or (2) at least one GPIO pin of the second pair of GPIO pins (i.e., at least one of $GPIO_3$ 322-3 or $GPIO_4$ 322-4). The at least one pin of the external device can be at least one of an $AUX_P$ pin or an $AUX_N$ pin. More specifically, the second internal MUX 305-2 can enable selection between the DP or TBT alternate mode and USB-C orientation.

The USB-C controller 210 can detect exposure to liquid by analyzing voltage changes of pins of the USB-C receptacle 100. For example, an external device configured to be connected to the USB-C receptacle 100 will present a pull-up resistance on its $DP_{SYS}$ pin (e.g., about 1.5 Ku), and a pull-down resistance on both of its $DP_{SYS}/DN_{SYS}$ pins (e.g., about 15 Ku). As a result, when the external device is connected to a USB-C receptacle 100, only the voltage on the $DP_{SYS}$ pin will change. Moreover, only one pair of DP/DN pins of the USB-C receptacle 100 will be active (e.g., the pair of $DP_1/DN_1$ pins 118-1 and 120-1 or the pair of $DP_2/DN_2$ pins 118-2 and 120-2 of FIG. 1). That is, both pairs of DP/DN pins will not be simultaneously active. Thus, in a USB-C receptacle, any voltage change on both pairs of DP/DN pins can indicate exposure to a liquid.

In some embodiments, the first internal MUX 305-1 is used to detect liquid exposure. For example, the USB-C controller 210 can periodically connect the $DP_1/DN_1$ pins and the $DP_2/DN_2$ pins of the USB-C receptacle 100 through the first internal MUX 305-1 to the $GPIO_1$ pin 322-1 and the $GPIO_2$ pin 322-2. The USB-C controller 210 can use the ADC 220 to measure a voltage on each of the $GPIO_1$ pin 322-1 and the $GPIO_2$ pin 322-2 by virtue of their respective connections to PUR 325-1 and PDR 327-1. The USB-C controller 210 can determine whether the voltage on each of the $GPIO_1$ pin 322-1 and the $GPIO_2$ pin 322-2 satisfies a threshold voltage condition. For example, determining whether the voltage on each of the $GPIO_1$ pin 322-1 and the $GPIO_2$ pin 322-2 satisfies the threshold condition can include determining whether a first voltage measured on the $GPIO_1$ pin 322-1 is greater than a first threshold voltage, and determining whether a second voltage measured on the $GPIO_2$ pin 322-2 is less than a second threshold voltage. In some embodiments, the first threshold voltage is about 3.2 V and the second threshold voltage is about 0.1 V. If the voltage on each of the GPIO$_1$ pin 322-1 and the GPIO$_2$ pin 322-2 satisfies the threshold condition, this means that there is no presence of a liquid on the USB-C receptacle 100. Otherwise, if the voltage on each of the GPIO$_1$ pin 322-1 and the GPIO$_2$ pin 322-2 does not satisfy the threshold condition, this means that there may be a liquid present on the USB-C receptacle 100. Thus, in response to determining that the voltage on each of the GPIO$_1$ pin 322-1 and the GPIO$_2$ pin 322-2 does not satisfy the threshold condition, the USB-C controller 210 can cause the USB-C receptacle 100 to enter a suspended state. After causing the USB-C receptacle 100 to enter the suspended state, the USB-C controller 210 can determine whether a liquid is present on the USB-C receptacle 100 by periodically scanning the USB-C receptacle 100. If the USB-C controller 210 determines that the liquid is still present on the USB-C receptacle 100, then the USB-C controller 210 can continue scanning the USB-C receptacle 100. Otherwise, if the USB-C controller 210 determines that liquid is no longer present on the USB-C receptacle 100 (i.e., the amount of liquid is undetectable), then the USB-C controller 210 can connect the USB-C receptacle 100 to an external device. More specifically, the USB-C controller 210 can connect the active pair of DP/DN pins of the USB-C receptacle 100 to the pair of DP$_{SYS}$/DN$_{SYS}$ pins of the external device. The USB-C controller 210 can then receive or provide power to the external device. For example, the external device can be a host device.

In some embodiments, the second internal MUX 305-2 is used to detect liquid exposure. For example, the USB-C controller 210 can periodically connect the SBU$_1$/SBU$_2$ pins of the USB-C receptacle 100 through the second internal MUX 305-2 to the GPIO$_3$ pin 322-3 and the GPIO$_4$ pin 322-4. The USB-C controller 210 can use the ADC 220 to measure a voltage on each of the GPIO$_3$ pin 322-3 and the GPIO$_4$ pin 322-4 by virtue of their respective connections to PUR 325-2 and PDR 327-2. The USB-C controller 210 can determine whether the voltage on each of the GPIO$_3$ pin 322-3 and the GPIO$_4$ pin 322-4 satisfies a threshold voltage condition. For example, determining whether the voltage on each of the GPIO$_3$ pin 322-3 and the GPIO$_4$ pin 322-4 satisfies the threshold condition can include determining whether a first voltage measured on the GPIO$_3$ pin 322-3 is greater than a first threshold voltage, and determining whether a second voltage measured on the GPIO$_4$ pin 322-4 is less than a second threshold voltage. In some embodiments, the first threshold voltage is about 3.2 V and the second threshold voltage is about 0.1 V. If the voltage on each of the GPIO$_3$ pin 322-3 and the GPIO$_4$ pin 322-4 satisfies the threshold condition, this means that there is no presence of a liquid on the USB-C receptacle 100. Otherwise, if the voltage on each of the GPIO$_3$ pin 322-3 and the GPIO$_4$ pin 322-4 does not satisfy the threshold condition, this means that there may be a liquid present on the USB-C receptacle 100. Thus, in response to determining that the voltage on each of the GPIO$_3$ pin 322-3 and the GPIO$_4$ pin 322-4 does not satisfy the threshold condition, the USB-C controller 210 can cause the USB-C receptacle 100 to enter a suspended state. After causing the USB-C receptacle 100 to enter the suspended state, the USB-C controller 210 can determine whether a liquid is present on the USB-C receptacle 100 by scanning the USB-C receptacle 100. If the USB-C controller 210 determines that there is still liquid present on the USB-C receptacle 100, then the USB-C controller can continue scanning the USB-C receptacle 100. Otherwise, if the USB-C controller 210 determines that liquid is no longer present on the USB-C receptacle 100 (i.e., the amount of liquid is undetectable), then the USB-C controller 210 can connect the USB-C receptacle 100 to an external device. More specifically, the USB-C controller 210 can connect the active pair of SBU pins of the USB-C receptacle 100 to the pair of AUX$_P$/AUX$_N$ pins of the external device. The USB-C controller can also then receive or provide power to the external device. For example, the external device can be a DP device or a TBT device implementing the TBT protocol.

Figure 4A:
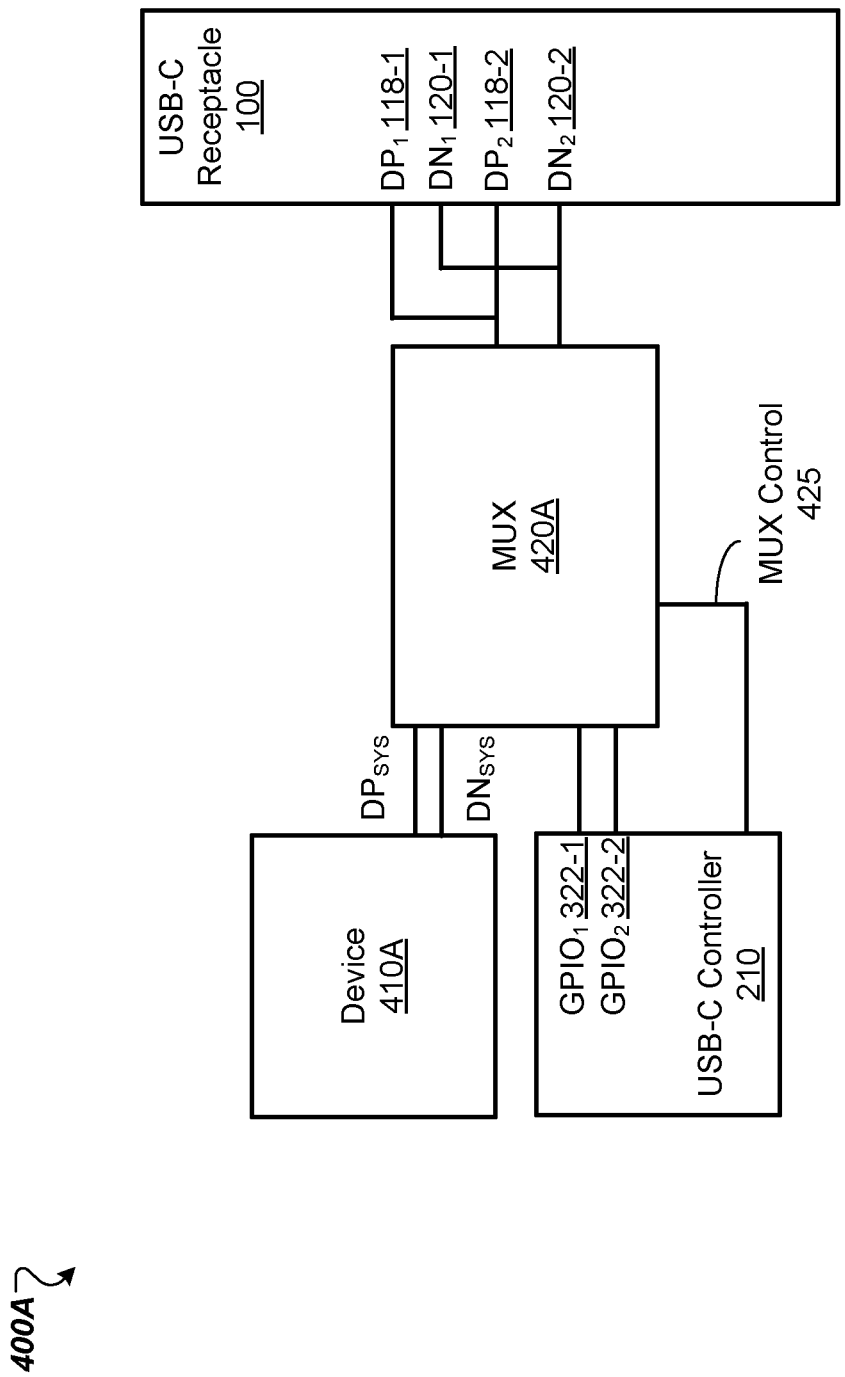
FIGS. 4A-4C are block diagrams of USB power delivery (USB-PD) devices with example architectures for detecting USB type-C (USB-C) receptacle exposure to liquids, in accordance with some embodiments.

FIG. 4A is a block diagram of a system 400A including a USB-PD device, in accordance with some embodiments. The system 400A includes the USB-C controller 210 and the USB-C receptacle 100, as described above with reference to FIGS. 2-3. The system 400A further includes an external device ("device") 410A. In some embodiments, the device 410A is a host device (e.g., a USB host device). The device 410A includes at least a DP$_{SYS}$ pin and a DN$_{SYS}$ pin. The system 400A further includes an external MUX ("MUX") 420A operatively coupled to the USB-C controller 210, the USB-C receptacle 100, and the device 410A. The MUX 420A can be controlled by the USB-C controller 210 via a MUX control line 425. In this illustrative example, the MUX 420A is a 2×1 MUX that is configured to selectively connect a pair of DP/DN pins of the USB-C receptacle 100 (e.g., DP$_1$ pin 118-1 and DN$_1$ pin 120-1, or DP$_2$ pin 118-2 and DN$_2$ pin 120-2) to either (1) the pair system data line pins of the device 410A (i.e., DP$_{SYS}$ and DN$_{SYS}$), or (2) the first pair of GPIO pins of the USB-C controller 210 (i.e., GPIO$_1$ pin 322-1 and GPIO$_2$ pin 322-2) to measure the voltage of the pair of DP/DN pins of the USB-C receptacle 100 for liquid exposure detection, as described in further detail above with reference to FIGS. 2-3 and as will be described in further detail below with reference to FIG. 6.

Figure 4B:
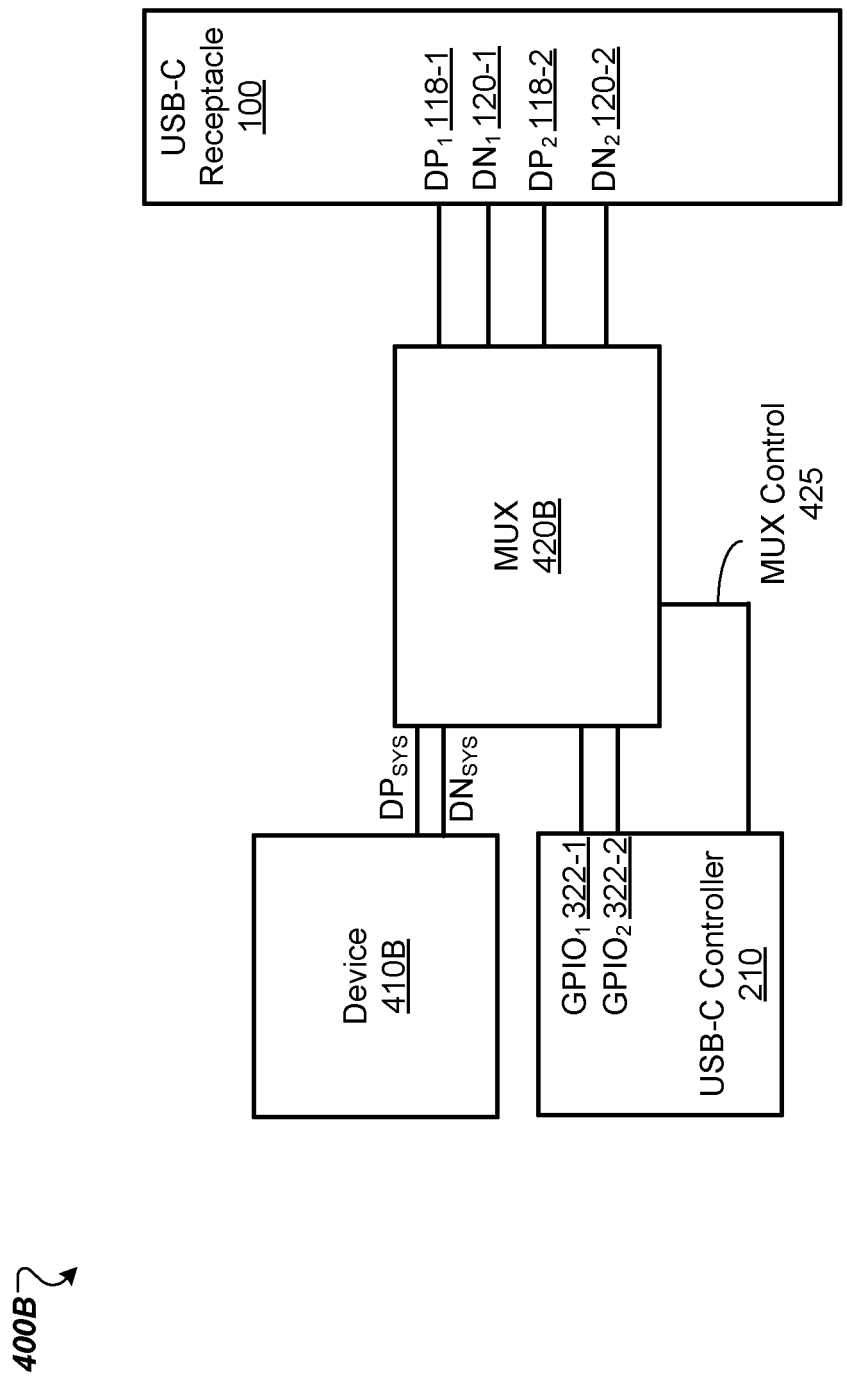

FIG. 4B is a block diagram of a system 400B including a USB-PD device, in accordance with some embodiments. The system 400B includes the USB-C controller 210 and the USB-C receptacle 100, as described above with reference to FIGS. 2-3. The system 400B further includes an external device ("device") 410B. In some embodiments, the device 410B is a host device (e.g., a USB host device). The device 410B includes at least a DP$_{SYS}$ pin and a DN$_{SYS}$ pin. The system 400B further includes an external MUX ("MUX") 420B operatively coupled to the USB-C controller 210, the USB-C receptacle 100, and the device 410B. The MUX 420B can be controlled by the USB-C controller 210 via a MUX control line 425. In this illustrative example, the MUX 420B is a 2×2 MUX that is configured to selectively connect a pair of DP/DN pins of the USB-C receptacle 100 (e.g., DP$_1$ pin 118-1 and DN$_1$ pin 120-1, or DP$_2$ pin 118-2 and DN$_2$ pin 120-2) to the pair of system data line pins of the device 410B (i.e., DP$_{SYS}$ and DN$_{SYS}$) and the first pair of GPIO pins of the USB-C controller 210 (i.e., GPIO$_1$ pin 322-1 and GPIO$_2$ pin 322-2) for liquid exposure detection, as described in further detail above with reference to FIGS. 2-3 and as will be described in further detail below with reference to FIG. 6.

Figure 4C:
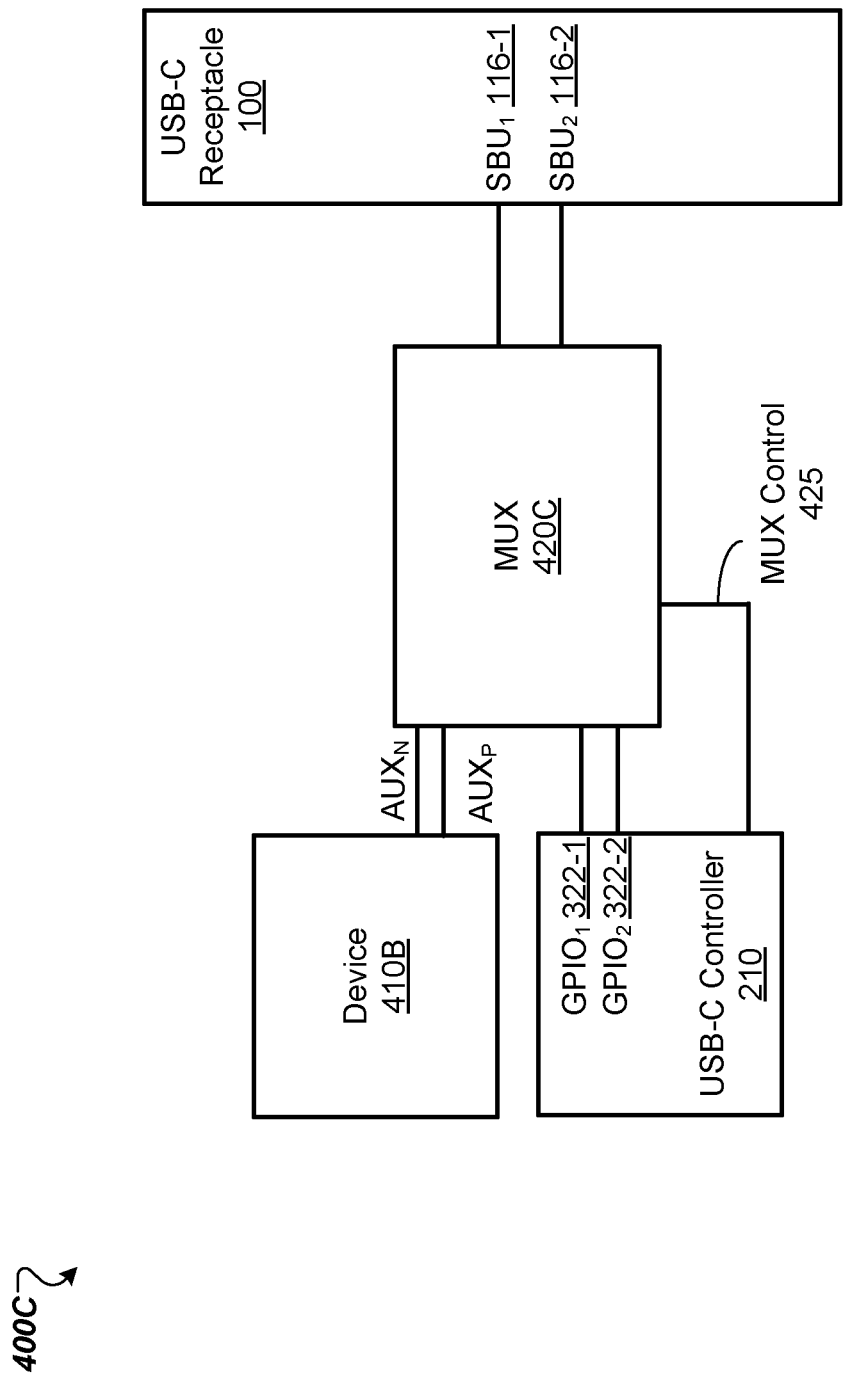

FIG. 4C is a block diagram of a system 400C including a USB-PD device, in accordance with some embodiments. The system 400C includes the USB-C controller 210 and the USB-C receptacle 100, as described above with reference to FIGS. 2-3. The system 400C further includes an external device ("device") 410C. In some embodiments, the device 410C is a DP controller or a TBT controller. The device 410C can include at least an AUX$_P$ port and an AUX$_N$ port. The system 400C further includes an external MUX ("MUX") 420C operatively coupled to the USB-C controller 210, the USB-C receptacle 100, and the device 410C. The MUX 420C can be controlled by the USB-C controller 210 via the MUX control line 425. In this illustrative example, the MUX 420C is a 2×1 MUX that is configured to selectively connect the pair of SBU pins of the USB-C receptacle 100 (i.e., $SBU_1$ pin 116-1 and $SBU_2$ pin 116-2) to either (1) a pair of $AUX_P/AUX_N$ pins of the device 410C, or (2) the first pair of GPIO pins of the USB-C controller 210 (i.e., $GPIO_1$ pin 322-1 and $GPIO_2$ pin 322-2) to measure the voltage of the pair of DP/DN pins of the USB-C receptacle 100 for liquid exposure detection, as described in further detail above with reference to FIGS. 2-3 and as will be described in further detail below with reference to FIG. 10.

Figure 5:
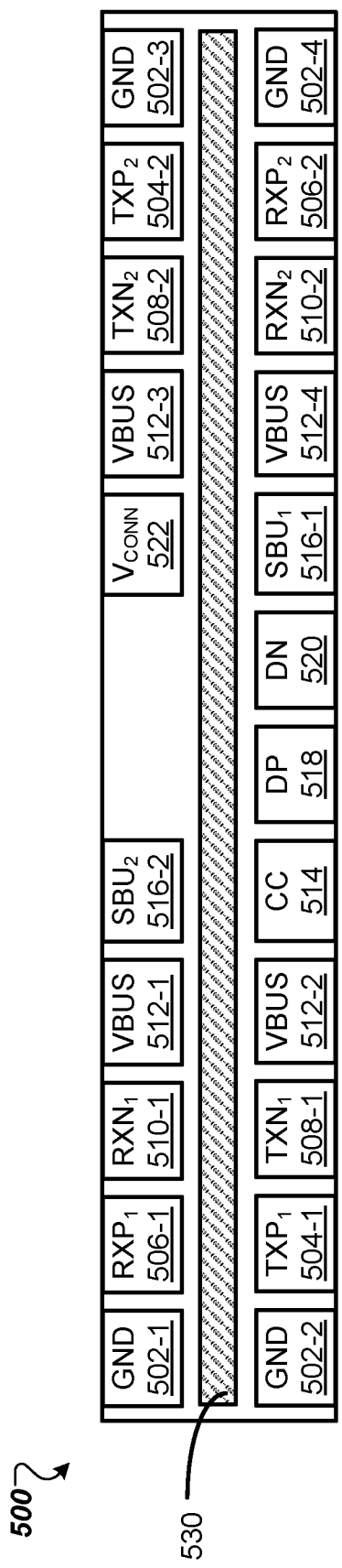
FIG. 5 is a block diagram of an example pinout of a USB type-C (USB-C) plug, in accordance with some embodiments.

FIG. 5 is a block diagram of a USB-C plug 500, according to some embodiments. The USB-C plug 500 includes a plurality of pins. Many of the pins of the USB-C plug 500 are replicated on the top and the bottom to reversibly fit into a USB-C receptacle (e.g., USB-C receptacle 100 of FIG. 1). For example, as shown, the pins can include GND pins 502-1 through 502-4, $TXP_1$ pin 504-1, $TXP_2$ pin 504-2, $RXP_1$ pin 506-1, $RXP_2$ pin 506-2, $TXN_1$ pin 508-1, $TXN_2$ pin 508-2, $RXN_1$ pin 510-1, $RXN_2$ pin 510-2, VBUS pins 512-1 through 512-4, CC pin 514, $SBU_1$ pin 516-1, $SBU_2$ pin 516-2, DP pin 518, DN pin 520, and $V_{CONN}$ pin 522. The USB-C plug 500 can further include an insulated divider 530 disposed through the center of the plug USB-C plug 500.

Figure 6:
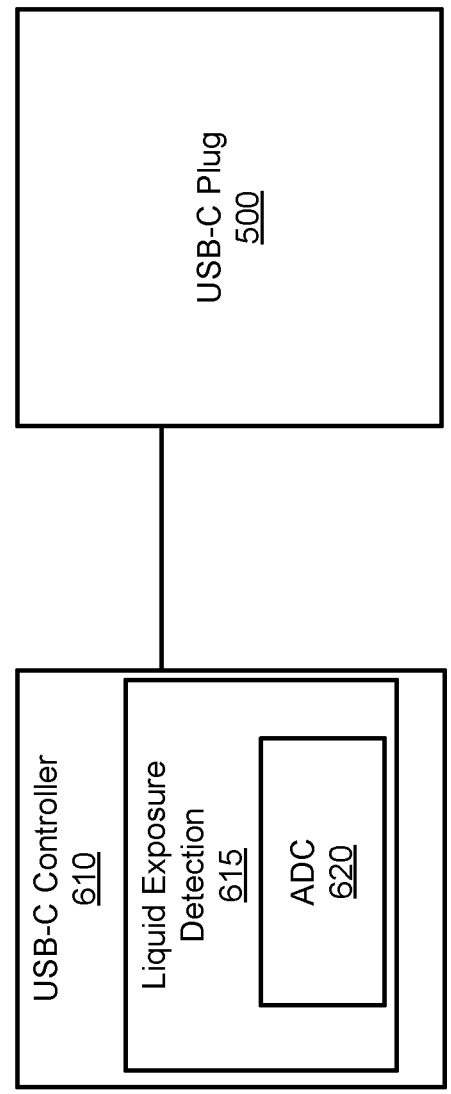
FIG. 6 is a block diagram of a USB power delivery (USB-PD) device with an example architecture for detecting USB type-C (USB-C) plug exposure to liquids, in accordance with some embodiments.

FIG. 6 is a block diagram of a USB-PD device 600, in accordance with some embodiments. The USB-PD device 600 can be implemented as a serial bus-compatible power supply device. An example of a serial bus-compatible power supply device may include a SBPD device, a USB-compatible power supply device, or the like. In some embodiments, the USB-PD device 600 is a multi-port USB-PD device compatible with the USB-PD standard or, more generally, with the USB standard. For example, the USB-PD device 600 may provide an output voltage (e.g., VBUS_C, power supply voltage) based on an input voltage (e.g., VBUS IN, power supply voltage) on each of the multiple ports. The USB-PD device 600 may facilitate communications between a primary-side controller and a secondary-side controller. The USB-PD device 600 may include a power converter (e.g., an AC-DC converter) and a power control analog subsystem (e.g., a USB-PD controller). The power control analog subsystem may include the circuitry, functionality, or both, as described herein for communicating information across a galvanic isolation barrier.

In some embodiments, the USB-PD device 600 is connected to a power source, such as a wall socket power source that provides AC power. In other embodiments, the power source may be a different power source, such as a vehicle battery, and may provide DC power to the USB-PD device 600. The power converter may convert the power received from a power source (e.g., convert power received to VBUS IN, ranging from 3.3V to 21.5V). For example, a power converter may be an AC-DC converter and convert AC power from the power source to DC power. In some embodiments, the power converter is a flyback converter, such as a secondary-controlled flyback converter, that provides galvanic isolation between the input (e.g., primary side) and the output (e.g., secondary side). The USB-PD device 600 can provide power to an external device. In some embodiments, the external device is a consumer device. The external device may control the gate-source voltage of its provider FET with a secondary gate driver integrated onto the secondary-side controller of the external device.

In some embodiments, the USB-PD device 600 provides VBUS_C to a sink device (e.g., by using the CC channel to negotiate a PD contract that specifies a particular output voltage and possibly an output current). The USB-PD device 600 may also provide access to ground potential (e.g., ground) to the sink device. In some embodiments, the providing of the VBUS_C is compatible with the USB-PD standard. The power control analog subsystem in the USB-PD device may receive VBUS IN from the power converter, and the power control analog subsystem may output VBUS IN. The power control analog subsystem is included in a USB Type-C controller compatible with the USB Type-C standard in some embodiments. The power control analog subsystem may provide system interrupts responsive to the VBUS IN and the VBUS_C.

In some embodiments, any of the components of the USB-PD device 600 may be part of an IC, or alternatively, any of the components of the USB-PD device 600 may be implemented in its own IC. For example, the power converter and the power control analog subsystem may be discrete ICs with separate packaging and pin configurations.

In some embodiments, the USB-PD device 600 may provide a complete USB Type-C and USB-Power Delivery port control solution for notebooks, dongles, monitors, docking stations, power adapters, vehicle chargers, power banks, mobile adaptors, and the like.

The USB-PD device 600 includes a USB-C controller 610 operatively coupled to USB-C plug 500. The USB-C controller 610 may be disposed in a chip package and can include liquid exposure detection circuitry 615 configured to detect exposure of the USB-C plug 500 to liquids, in accordance with the techniques described herein. For example, the liquid exposure detection circuitry 215 can include an ADC 620. The USB-C controller 610 is configured to negotiate a PD contract with the external device, which can be attached to the USB-C plug 500, and controlled through an output pin with the required VBUS voltage. The USB-C plug 500 can also be referred to as a USB-C connector and is typically associated with a USB-C plug, but it should be understood that in various embodiments, the USB-C plug 500 may be associated with a USB-C port instead. Further details regarding the USB-C controller 610, the liquid exposure detection circuitry 615 including the ADC 620, and the USB-C plug 500 will now be described below with reference to FIG. 7.

Figure 7:
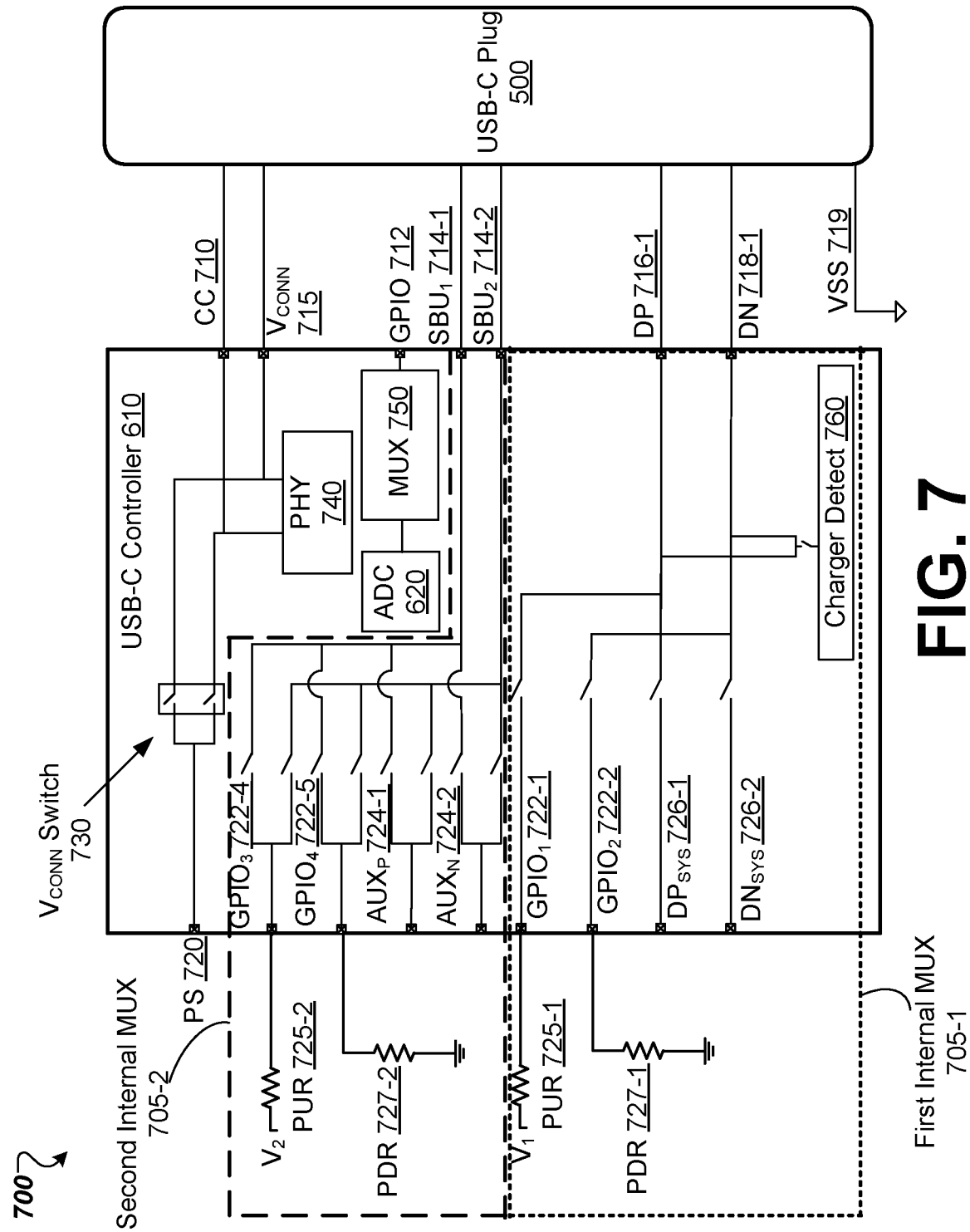
FIG. 7 is a block diagram of an example USB power delivery (USB-PD) device with an example architecture for detecting USB type-C (USB-C) plug exposure to liquids, in accordance with some embodiments.

FIG. 7 is a block diagram of an example USB-PD device 700, in accordance with some embodiments. As shown, the USB-PD device 700 includes the USB-C controller 610 and the USB-C plug 500.

The USB-C controller 610 can include a first port. For example, the first port can include a CC pin 710 connected to a CC pin of the USB-C plug 500 (e.g., CC pin 514 of FIG. 5), a GPIO pin 712, an $SBU_1$ pin 714-1 connected to an $SBU_1$ pin of the USB-C plug 500 (e.g., $SBU_1$ pin 516-1 of FIG. 5), an $SBU_2$ pin 714-2 connected to an $SBU_2$ pin of the USB-C plug 500 (e.g., $SBU_2$ pin 516-2 of FIG. 5), a $V_{CONN}$ pin 715 connected to a $V_{CONN}$ pin of the USB-C plug 500 (e.g., $V_{CONN}$ pin 522 of FIG. 5), a DP pin 716 connected to a DP pin of the USB-C plug 500 (e.g., DP pin 518 of FIG. 5), and a DN pin 718 connected to a DN pin of the USB-C plug 500 (e.g., DN pin 520 of FIG. 5).

The GPIO pin 712 can be associated with a plurality of GPIOs. In some embodiments, the GPIO pin 712 is associated with 13 GPIOs. The SBU pins 714-1 and 714-2 may be used to establish communications with other-than-USB protocols in alternate modes, such as with the DP protocol, HDMI protocol, the TBT protocol, the MHL protocol, the PCIe protocol, etc.

The USB-C controller 610 can further include a second port. For example, the second port can include a PS pin 720, a first pair of GPIO pins including $GPIO_1$ pin 722-1 and $GPIO_2$ pin 722-2, a second pair of GPIO pins including GPIO$_3$ pin 722-3 and GPIO$_4$ pin 722-4, AUX$_P$ pin 724-1, AUX$_N$ pin 724-2, DP$_{SYS}$ pin 726-1 and DP$_{SYS}$ pin 726-1. GPIO$_1$ pin 722-1 can be connected to one end of a PUR 725-1 and GPIO$_2$ pin 722-2 can be connected to one end of a PDR 727-1. GPIO$_3$ pin 722-3 can be connected to one end of a PUR 725-2 and GPIO$_4$ pin 722-4 can be connected to one end of a PDR 727-2. A voltage source providing voltage $V_1$ can be connected to the other end of PUR 725-1 and a voltage source providing voltage $V_2$ can be connected to the other end PUR 725-2. In some embodiments, $V_1$ and $V_2$ are each about 3.3 V. The other ends of PDRs 727-1 and 727-2 can each be connected to GND (e.g., 0 V).

The PS pin 720 is connected to the CC pin 710 the $V_{CONN}$ pin 715 for providing an input to power a USB-C connection (e.g., EMCA cable). For example, the input can range between about 4.85 V to about 5.5 V. The AUX$_P$ pin 724-1 and the AUX$_N$ pin 724-2 can provide auxiliary signals for DP protocol signaling. USB-C plug 500 can be connected to a VSS pin 719 (e.g., GND).

The USB-C controller 610 can further include a $V_{CONN}$ switch 730 and a PHY 740, each connected to the CC pin 710 and the $V_{CONN}$ pin 715. The $V_{CONN}$ switch 730 can control which of the CC pin 710 or the $V_{CONN}$ pin 715 is being used. PHY 740 can be similar to PHY 340 of FIG. 3.

The USB-C controller 610 can further include the ADC 620 operatively coupled to a MUX bus 750. More specifically, the MUX bus 750 can be an analog MUX bus. For example, the ADC 620 can be a successive-approximate register ADC (SAR ADC). In some embodiments, the ADC 620 is an 8-bit ADC, including an 8-bit digital-to-analog converter (DAC) and a comparator. The output of the DAC can form the positive input of the comparator. The negative input of the comparator can be received from the MUX bus 750. The GPIO pins of the USB-C controller 610 have access to the ADC 620 through the MUX bus 750. The CC pin 710 and the $V_{CONN}$ pin 715 are not available to connect to the MUX bus 750. In some embodiments, the MUX bus 750 is an AMUX bus that can connect zero, one, or more analog signals to a different common analog signal. For example, the MUX bus 750 can be used to connect more than one analog signal at a time to provide crossbar switch support.

The USB-C controller 610 can include a first internal MUX 705-1. The first internal MUX 705-1 can be referred to as a "USB 2.0 MUX." More specifically, the first internal MUX 705-1 can be a HS USB 2.0 MUX. The first internal MUX 705-1 can be a 2×1 MUX, including a 2×1 crossbar switch to route the DP$_{SYS}$ and DN$_{SYS}$ lines of the USB-C controller 610 to the DP/DN lines. The first internal MUX 705-1 can be configured to selectively connect at least one of the DP/DN pins of the USB-C controller 610 (e.g., at least one of DP 716 or DN 718) to either (1) at least one of the system DP/DN pins of the USB-C controller 610 (i.e., at least one the DP$_{SYS}$ pin 726-1 or the DN$_{SYS}$ pin 726-2) or (2) at least one GPIO pin of the first pair of GPIO pins of the USB-C controller 610 (i.e., at least one of GPIO$_1$ pin 722-2 or GPIO$_2$ pin 722-2).

The first internal MUX 705-1 can further include a charger detect circuit 760 for determining that a charging circuit is present. The charger detector circuit 760 may detect whether an external device, through the USB-C plug 500, includes a USB charger and thus contains a battery to be charged rather than connected for high-speed data transfer. The charger detector circuit 760 may include a first switch coupled to the DP$_{SYS}$ pin 726-1 and a second switch coupled to the DN$_{SYS}$ pin 726-2 to facilitate the selective coupling just referenced. In some embodiments, the first and second switches are controllable by logic (e.g., firmware, state machine, or other logic) to disconnect the charger detector circuit 760 during high-speed data transfer of the USB-C controller, which reduces the battery charging capacitive load on the lines connected to the DP/DN pins and maintains better signal integrity. In various embodiments, after the charger detector circuit 760 detects whether to perform charging or high-speed data transfer, the charger detector circuit 760 may open the first and second switches to disconnect the charger detector circuit 760. Alternatively, the charger detector circuit 760 may be disconnected after a set time window or upon a predetermined signal from the logic.

The USB-C controller 610 can further include a second internal MUX 705-2. The second internal MUX 705-2 can be referred to as an "SBU MUX." The second internal MUX 705-2 can be a 2×1 MUX configured to selectively connect the SBU pins of the USB-C plug 500 (e.g., SBU$_1$ pin 516-1 and SBU$_2$ pin 516-2 of FIG. 5) to either (1) at least one pin of an external device (e.g., host device or display device) or (2) at least one GPIO pin of the second pair of GPIO pins (i.e., at least one of GPIO$_3$ 722-3 or GPIO$_4$ 722-4). The at least one pin of the external device can be at least one of an AUX$_P$ pin or an AUX$_N$ pin. More specifically, the second internal MUX 705-2 can enable selection between the DP or TBT alternate mode and USB-C orientation.

The USB-C controller 610 can detect exposure to liquid by analyzing voltage changes of pins of the USB-C plug 500. For example, a first external device (e.g., full speed or high-speed device) configured to be connected to the USB-C plug 500 can present a pull-up resistance on one of its system data line pins (e.g., DP$_{SYS}$ pin), and a second external device (e.g., host device) can present a pull-down resistance on both of its system data line pins (i.e., the DP$_{SYS}$ pin and the DN$_{SYS}$ pins). For example, the pull-up resistance can be about 1.5 KΩ and the pull-down resistance can be about 15 KΩ. As a result, when the USB-C plug is connected to the first external device, there won't be any change to the DP/DN voltage. Similarly, when the USB-C plug 500 is connected to the second external device, only the voltage on the DP$_{SYS}$ pin may change and the voltage on the DN$_{SYS}$ pin may be 0 V. Thus, these parameters can be used to differentiate between an actual connection between an external device and the USB-C plug 500, and exposure of the USB-C plug 500 to a liquid.

In some embodiments, the first internal MUX 705-1 is used to detect liquid exposure. For example, the USB-C controller 610 can periodically connect the DP/DN pins of the USB-C plug 500 through the first internal MUX 705-1 to the GPIO$_1$ pin 722-1 and the GPIO$_2$ pin 722-2. The USB-C controller 610 can use the ADC 620 to measure a voltage on each of the GPIO$_1$ pin 722-1 and the GPIO$_2$ pin 722-2 by virtue of their respective connections to PUR 725-1 and PDR 727-1. The USB-C controller 610 can determine whether the voltage on each of the GPIO$_1$ pin 722-1 and the GPIO$_2$ pin 722-2 satisfies a threshold voltage condition. For example, determining whether the voltage on each of the GPIO$_1$ pin 722-1 and the GPIO$_2$ pin 722-2 satisfies the threshold condition can include determining whether a first voltage measured on the GPIO$_1$ pin 722-1 is greater than a first threshold voltage, and determining whether a second voltage measured on the GPIO$_2$ pin 722-2 is less than a second threshold voltage. In some embodiments, the first threshold voltage is about 3.2 V and the second threshold voltage is about 0.1 V. If the voltage on each of the GPIO$_1$ pin 722-1 and the GPIO$_2$ pin 722-2 satisfies the threshold condition, this means that there is no presence of a liquid on the USB-C plug 500. Otherwise, if the voltage on each of the GPIO$_1$ pin 722-1 and the GPIO$_2$ pin 722-2 does not satisfy the threshold condition, this means that there may be a liquid present on the USB-C plug 500. Thus, in response to determining that the voltage on each of the GPIO$_1$ pin 722-1 and the GPIO$_2$ pin 722-2 does not satisfy the threshold condition, the USB-C controller 610 can cause the USB-C plug 500 to enter a suspended state. After causing the USB-C plug 500 to enter the suspended state, the USB-C controller 610 can determine whether a liquid is present on the USB-C plug 500 by periodically scanning the USB-C plug 500. If the USB-C controller 610 determines that the liquid is still present on the USB-C plug 500, then the USB-C controller 610 can continue scanning the USB-C plug 500. Otherwise, if the USB-C controller 610 determines that liquid is no longer present on the USB-C plug 500 (i.e., the amount of liquid is undetectable), then the USB-C controller 610 can connect the USB-C receptacle 100 to an external device. More specifically, the USB-C controller 610 can connect the active pair of DP/DN pins of the USB-C plug 500 to the pair of DP$_{SYS}$/DN$_{SYS}$ pins of the external device. The USB-C controller can also then receive or provide power to the external device. For example, the external device can be a host device.

In some embodiments, the second internal MUX 705-2 is used to detect liquid exposure. For example, the USB-C controller 610 can periodically connect the SBU$_1$/SBU$_2$ pins of the USB-C plug 500 through the second internal MUX 705-2 to the GPIO$_3$ pin 722-3 and the GPIO$_4$ pin 722-4. The USB-C controller 610 can use the ADC 620 to measure a voltage on each of the GPIO$_3$ pin 722-3 and the GPIO$_4$ pin 722-4 by virtue of their respective connections to the PUR 725-2 and PDR 727-2. The USB-C controller 610 can determine whether the voltage on each of the GPIO$_3$ pin 722-3 and the GPIO$_4$ pin 722-4 satisfies a threshold voltage condition. For example, determining whether the voltage on each of the GPIO$_3$ pin 722-3 and the GPIO$_4$ pin 722-4 satisfies the threshold condition can include determining whether a first voltage measured on the GPIO$_3$ pin 722-3 is greater than a first threshold voltage, and determining whether a second voltage measured on the GPIO$_4$ pin 722-4 is less than a second threshold voltage. In some embodiments, the first threshold voltage is about 3.2 V and the second threshold voltage is about 0.1 V. If the voltage on each of the GPIO$_3$ pin 722-3 and the GPIO$_4$ pin 722-4 satisfies the threshold condition, this means that there is no presence of a liquid on the USB-C plug 500. Otherwise, if the voltage on each of the GPIO$_3$ pin 722-3 and the GPIO$_4$ pin 722-4 does not satisfy the threshold condition, this means that there may be a liquid present on the USB-C plug 500. Thus, in response to determining that the voltage on each of the GPIO$_3$ pin 722-3 and the GPIO$_4$ pin 722-4 does not satisfy the threshold condition, the USB-C controller 610 can cause the USB-C plug 500 to enter a suspended state. After causing the USB-C plug 500 to enter the suspended state, the USB-C controller 610 can determine whether a liquid is present on the USB-C plug 500 by scanning the USB-C plug 500. If the USB-C controller 610 determines that there is still liquid present on the USB-C plug 500, then the USB-C controller can continue scanning the USB-C plug 500. Otherwise, if the USB-C controller 610 determines that liquid is no longer present on the USB-C plug 500 (i.e., the amount of liquid is undetectable), then the USB-C controller 610 can connect the USB-C plug 500 to an external device. More specifically, the USB-C controller 610 can connect the active pair of SBU pins of the USB-C plug 500 to the pair of AUX$_P$/AUX$_N$ pins of the external device. The USB-C controller can also then receive or provide power to the external device. For example, the external device can be a DP device or a TBT device implementing the TBT protocol.

Figure 8A:
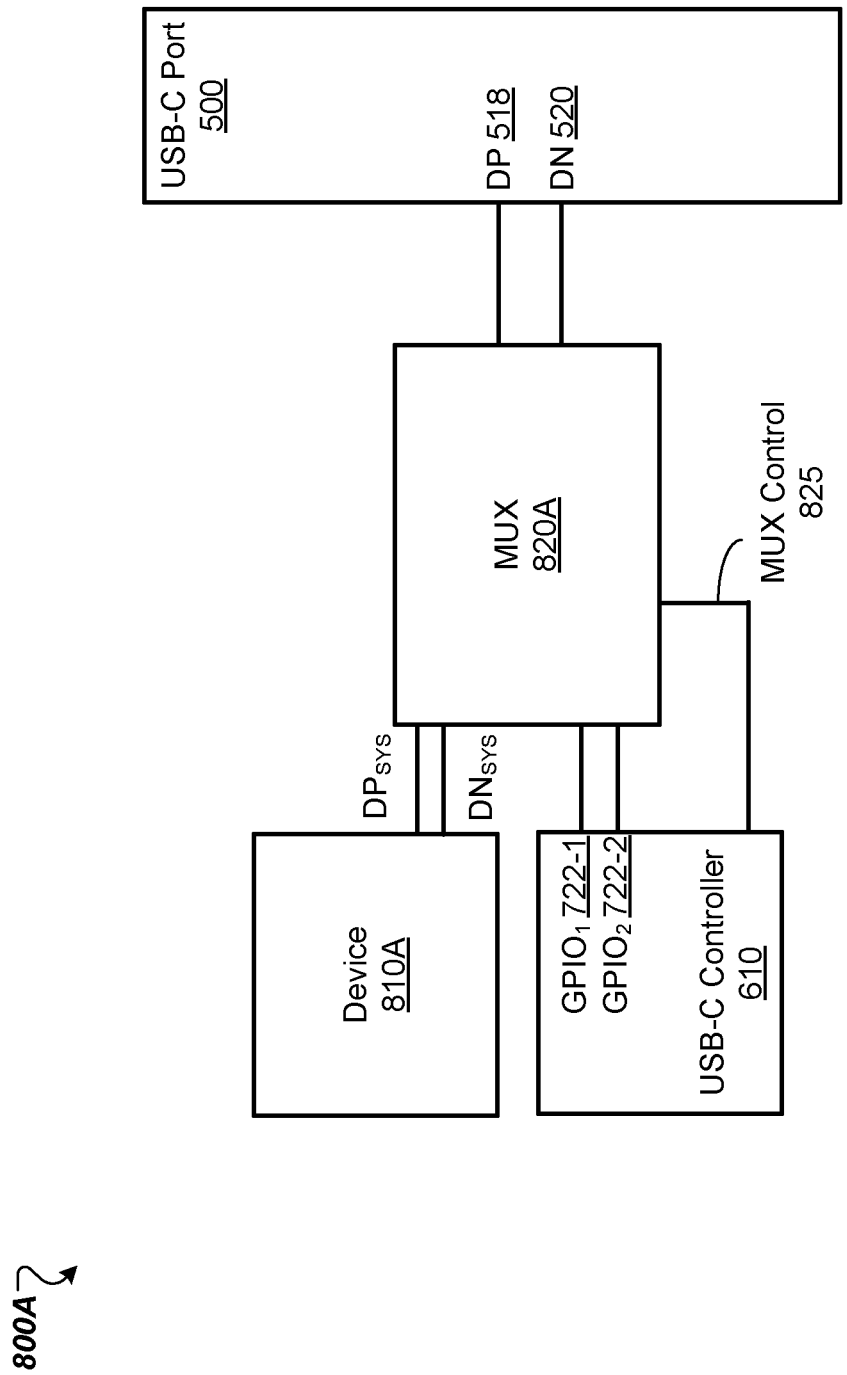
FIGS. 8A-8B are block diagrams of USB power delivery (USB-PD) devices with example architectures for detecting USB type-C (USB-C) plug exposure to liquids, in accordance with some embodiments.

FIG. 8A is a block diagram of a system 800A including a USB-PD device, in accordance with some embodiments. The system 800A includes the USB-C controller 610 and the USB-C plug 500, as described above with reference to FIGS. 6-7. The system 800A further includes an external device ("device") 810A. In some embodiments, the device 810A is a host device (e.g., a USB host device). The device 810A includes at least a DP$_{SYS}$ pin and a DN$_{SYS}$ pin. The system 800A further includes an external MUX ("MUX") 820A operatively coupled to the USB-C controller 610, the USB-C plug 500, and the device 810A. The MUX 820A can be controlled by the USB-C controller 610 via a MUX control line 825. In this illustrative example, the MUX 820A is a 2×1 MUX that is configured to selectively connect the pair of DP/DN pins of the USB-C plug 500 (e.g., Di pin 518 and DN pin 520) to either (1) the pair of system data line pins of the device 810A (i.e., DP$_{SYS}$ and DN$_{SYS}$), or (2) the first pair of GPIO pins of the USB-C controller 610 (i.e., GPIO$_1$ pin 522-1 and GPIO$_2$ pin 522-2) to measure the voltage of the pair of DP/DN pins of the USB-C plug 500 for liquid exposure detection, as described in further detail above with reference to FIGS. 6-7 and as will be described in further detail below with reference to FIG. 10.

Figure 8B:
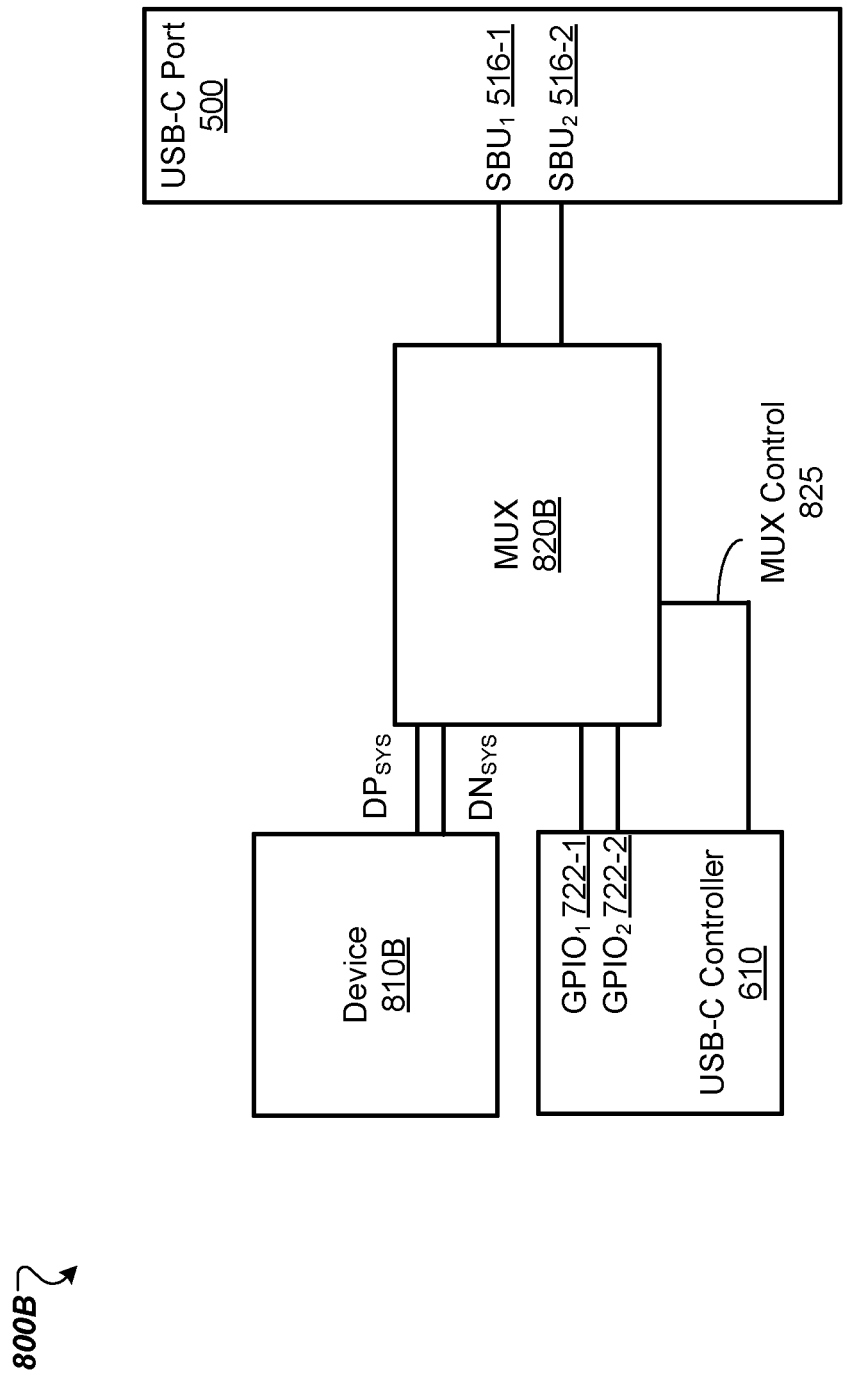

FIG. 8B is a block diagram of a system 800B including a USB-PD device, in accordance with some embodiments. The system 800B includes the USB-C controller 610 and the USB-C plug 500, as described above with reference to FIGS. 6-7. The system 800B further includes an external device ("device") 810B. In some embodiments, the device 810B is a DP controller or a TBT controller. The device 810B can include at least an AUX$_P$ port and an AUX$_N$ port. The system 800B further includes an external MUX ("MUX") 820B operatively coupled to the USB-C controller 610, the USB-C plug 500, and the device 810B. The MUX 820B can be controlled by the USB-C controller 610 via the MUX control line 825. In this illustrative example, the MUX 820B is a 2×1 MUX that is configured to selectively connect the pair of SBU pins of the USB-C plug 500 (i.e., SBU$_1$ pin 516-1 and SBU$_2$ pin 516-2) to either (1) a pair of AUX$_P$/AUX$_N$ pins of the device 810B, or (2) the first pair of GPIO pins of the USB-C controller 610 (i.e., GPIO$_1$ pin 522-1 and GPIO$_2$ pin 522-2) to measure the voltage of the pair of DP/DN pins of the USB-C plug 500 for liquid exposure detection, as described in further detail above with reference to FIGS. 6-7 and as will be described in further detail below with reference to FIG. 10.

Figure 9:
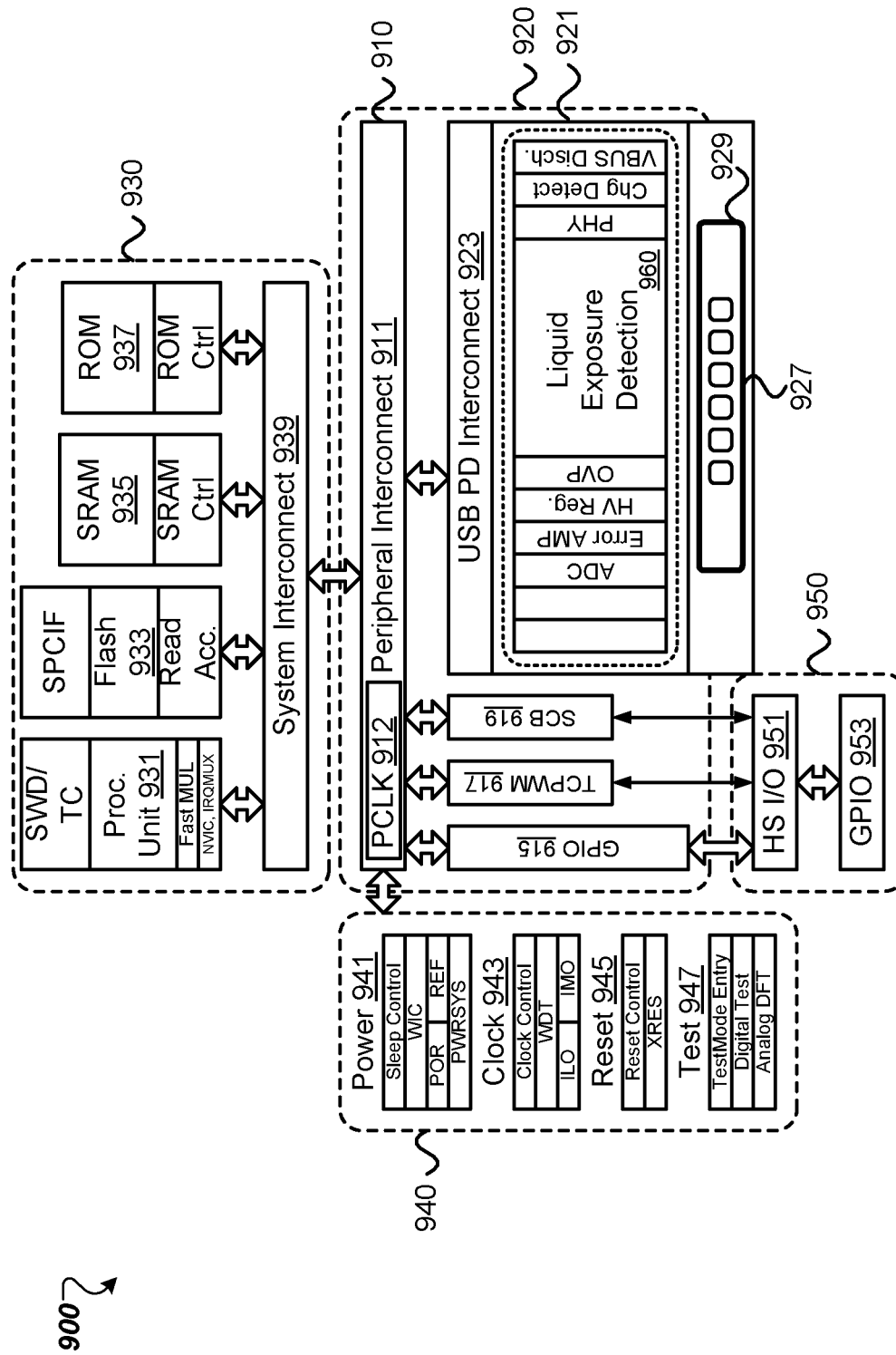
FIG. 9 is a block diagram illustrating a system for a USB device with liquid exposure detection in USB power delivery (USB-PD), in accordance with some embodiments.

FIG. 9 is a block diagram illustrating an integrated circuit (IC) system ("system") 900 for a USB device with liquid exposure detection in USB-PD, in accordance with some embodiments. System 900 may include a peripheral subsystem 910, including a number of components for use in USB-PD. Peripheral subsystem 910 may include a peripheral interconnect 911 with a clocking module and a peripheral clock (PCLK) 912 for providing clock signals to the various components of peripheral subsystem 910. Peripheral interconnect 911 may be a peripheral bus, such as a single-level or multi-level advanced high-performance bus (AHB), and may provide a data and control interface between peripheral subsystem 910, CPU subsystem 930, and system resources 940. Peripheral interconnect 911 may include controller circuits, such as direct memory access (DMA) controllers, which may be programmed to transfer data between peripheral blocks without input by, control of, or burden on CPU subsystem 930.

The peripheral interconnect 911 may be used to couple components of peripheral subsystem 910 to other components of system 900. Coupled to peripheral interconnect 911 may be a number of general-purpose input/outputs (GPIO pins) 915 for sending and receiving signals. GPIO pins 915 may include circuits configured to implement various functions such as the pull-up, pull-down, input threshold select, input, and output buffer enabling/disabling, single multiplexing, etc. Still, other functions may be implemented by or through GPIO pins 915, e.g., such as the liquid exposure detection circuits (e.g., circuit(s) 215 in FIG. 2 and circuit(s) 615 in FIG. 6) configured as described herein for detecting exposure to liquids on USB-C receptacles and plugs. One or more timer/counter/pulse-width modulator (TCPWM) 917 may also be coupled to the peripheral interconnect and include circuitry for implementing timing circuits (timers), counters, pulse-width modulators (PWMs) decoders, and other digital functions that may operate on I/O signals and provide digital signals to system components of system 900. Peripheral subsystem 910 may also include one or more serial communication blocks (SCBs) 919 for implementation of serial communication interfaces such as I2C, serial peripheral interface (SPI), universal asynchronous receiver/transmitter (UART), controller area network (CAN), clock extension peripheral interface (CXPI), etc.

For USB power delivery applications, peripheral subsystem 910 may include a USB power delivery subsystem 920 coupled to the peripheral interconnect and comprising a set of USB-PD modules 921 for use in USB power delivery. USB-PD modules 921 may be coupled to the peripheral interconnect 911 through a USB-PD interconnect 923. USB-PD modules 921 may include an analog-to-digital conversion (ADC) module for converting various analog signals to digital signals; an error amplifier (AMP) for regulating the output voltage on the VBUS line per a PD contract; a high-voltage (HV) regulator for converting the power source voltage to a precise voltage (such as 3.5-5V) to power system 900; an over-voltage protection (OVP) module for providing over-voltage protection on the VBUS line with configurable thresholds and response times; one or more gate drivers for external power field-effect transistors (FETs) used in USB power delivery in provider and consumer configurations; a PHY for supporting CC communications; and liquid exposure detection component 960. USB-PD modules 921 may also include a charger detect module for determining that a charging circuit is present and coupled to system 900 and a VBUS discharge module for controlling the voltage discharge on VBUS. USB power delivery subsystem 920 may also include pads 927 for external connections and electrostatic discharge (ESD) protection circuitry 929, which may be required on a USB-C port. USB-PD modules 921 may also include a communication module for retrieving and communicating information stored in a non-volatile memory controller with another controller, such as between a primary-side controller and a secondary-side controller of a flyback converter. USB-PD modules 921 may also include one or more modules for floating ground circuits for fault detection, as described herein.

GPIO 915, TCPWM 917, and SCB 919 may be coupled to an input/output (I/O) subsystem 950, which may include a high-speed (HS) I/O matrix 991 coupled to a number of GPIO pins 993. GPIO pins 915, TCPWM 917, and SCB 919 may be coupled to GPIO pins 993 through HS I/O matrix 991.

System 900 may also include a central processing unit (CPU) subsystem 930 for processing commands and storing program information and data. CPU subsystem 930 may include one or more processing units 931 for executing instructions and reading from and writing to memory locations from a number of memories. Processing unit 931 may be a processor suitable for operation in an integrated circuit (IC) or a system-on-chip (SOC) device. In some embodiments, processing unit 931 may be optimized for low-power operation with extensive clock gating. In this embodiment, various internal control circuits may be implemented for processing unit operation in various power states. For example, processing unit 931 may include a wake-up interrupt controller (WIC) configured to wake the processing unit up from a sleep state, allowing power to be switched off when the IC or SOC is in a sleep state. CPU subsystem 930 may include one or more memories, including a flash memory 933, static random access memory (SRAM) 935, and a read-only memory (ROM) 937. Flash memory 933 may be a non-volatile memory (NAND flash, NOR flash, etc.) configured for storing data, programs, and/or other firmware instructions. Flash memory 933 may include a read accelerator and may improve access times by integration within CPU subsystem 930. SRAM 935 may be a volatile memory configured for storing data and firmware instructions accessible by processing unit 931. ROM 937 may be configured to store boot-up routines, configuration parameters, and other firmware parameters and settings that do not change during the operation of system 900. SRAM 935 and ROM 937 may have associated control circuits. Processing unit 931 and the memories may be coupled to a system interconnect 939 to route signals to and from the various components of CPU subsystem 930 to other blocks or modules of system 900. System interconnect 939 may be implemented as a system bus, such as a single-level or multi-level AHB. System interconnect 939 may be configured as an interface to couple the various components of CPU subsystem 930 to each other. System interconnect 939 may be coupled to peripheral interconnect 911 to provide signal paths between the components of CPU subsystem 930 and peripheral subsystem 910.

System 900 may also include a number of system resources 940, including a power module 941, a clock module 943, a reset module 945, and a test module 947. Power module 941 may include a sleep control module, a wake-up interrupt control (WIC) module, a power-on-reset (POR) module, a number of voltage references (REF), and a PWRSYS module. In some embodiments, power module 941 may include circuits that allow system 900 to draw and/or provide power from/to external sources at different voltage and/or current levels and support controller operation in different power states, such as active, low-power, or sleep. In various embodiments, more power states may be implemented as system 900 throttles back operation to achieve a desired power consumption or output. Clock module 943 may include a clock control module, a watchdog timer (WDT), an internal low-speed oscillator (ILO), and an internal main oscillator (IMO). Reset module 945 may include a reset control module and an external reset (XRES) module. Test module 947 may include a module to control and enter a test mode as well as testing control modules for analog and digital functions (digital test and analog DFT).

System 900 may be implemented as an IC in a monolithic (e.g., single) semiconductor die. In other embodiments, various portions or modules of system 900 may in implemented on different semiconductor dies. For example, memory modules of CPU subsystem 930 may be on-chip or separate. In still other embodiments, some separate-die circuits may be packaged into a single "chip," while other circuits may include external components disposed on a circuit board (or in a USB connector) as separate elements.

System 900 may be implemented in a number of application contexts to provide USB-PD functionality thereto. In each application context, an IC controller or SOC implementing system 900 may be disposed and configured in an electronic device (e.g., a USB-enabled device) to perform operations in accordance with the techniques described herein. In one example embodiment, a system 900 may be disposed and configured in a personal computer (PC) power adapter for a laptop, a notebook computer, etc. In another example embodiment, system 900 may be disposed and configured in a power adapter (e.g., a wall charger) for a mobile electronic device (e.g., a smartphone, a tablet, etc.). In another example embodiment, system 900 may be disposed and configured in a wall socket that is configured to provide power over USB Type-A and/or Type-C port(s). In another example embodiment, system 900 may be disposed and configured in a car charger that is configured to provide power over USB Type-A and/or Type-C port(s). In yet another example embodiment, system 900 may be disposed and configured in a power bank that can get charged and then provide power to another electronic device over a USB Type-A or Type-C port. In other embodiments, a system like system 900 may be configured with the floating ground and fault detection circuitry described herein and may be disposed in various other USB-enabled electronic or electromechanical devices.

It should be understood that a system, like system 900 implemented on or as an IC controller, may be disposed into different applications, which may differ with respect to the type of power source being used and the direction in which power is being delivered. For example, in the case of a car charger, the power source is a car battery that provides DC power, while in the case of a mobile power adapter, the power source is an AC wall socket. Further, in a PC power adapter, the flow of power delivery is from a provider device to a consumer device. In contrast, in the case of a power bank, the flow of power delivery may be in both directions depending on whether the power bank operates as a power provider (e.g., to power another device) or as a power consumer (e.g., to get charged itself). For these reasons, the various applications of system 900 should be regarded in an illustrative rather than a restrictive sense.

Figure 10:
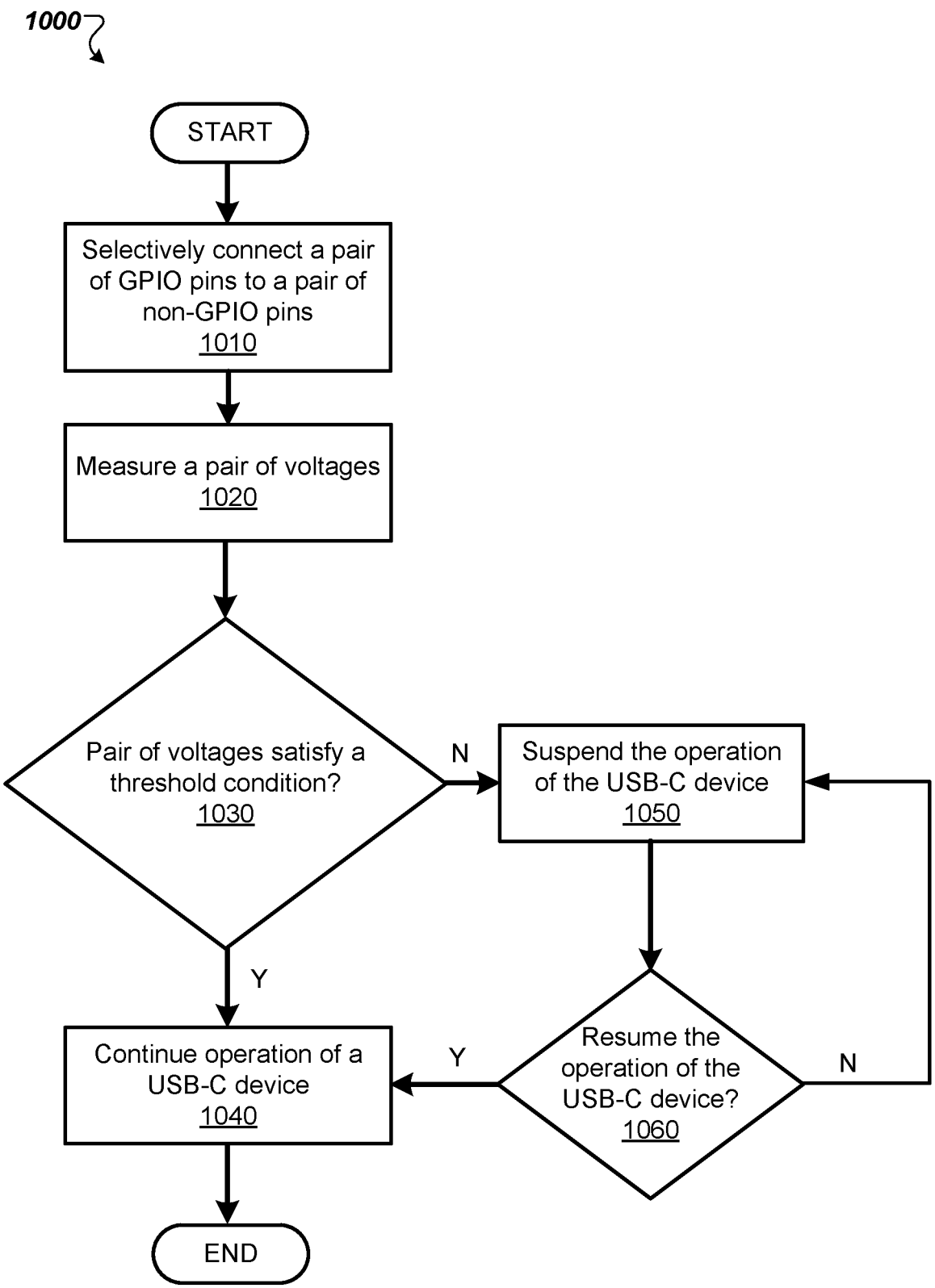
FIG. 10 is a flow diagram of an example method of detecting USB type-C (USB-C) device exposure to liquids, in accordance with some embodiments.

FIG. 10 is a flow diagram of a method 1000 of detecting USB type-C (USB-C) device exposure to liquids, in accordance with some embodiments. The method 1000 may be performed by processing logic that comprises hardware (e.g., circuitry, dedicated logic, programmable logic, microcode, etc.), firmware, or a combination thereof. The method 1000 may be performed by any of the processing devices described herein. In some embodiments, the method 1000 is performed by the USB-C controller 210 of FIGS. 2-4C. In some embodiments, the processing logic executes a firmware-based method that performs the following operations in conjunction with digital and/or analog circuitry. In some embodiments, the processing logic includes digital/analog circuitry that is configured to perform the following operations.

At block 1010, processing logic selective connects a pair of GPIO pins to the pair of non-GPIO pins. More specifically, processing logic can cause a MUX to selectively connect the pair of GPIO pins to the pair of non-GPIO pins. The pair of GPIO pins can include a first GPIO pin and a second GPIO pin. For example, the first GPIO pin can be connected to a pull-up resistor and the second GPIO pin can be connected to a pull-down resistor. The pair of non-GPIO pins can include a first non-GPIO pin and a second non-GPIO pin.

At block 1020, processing logic measures a pair of voltages. For example, processing logic can cause the pair of voltages to be measured. The pair of voltages can include a first voltage measured for the first GPIO pin and a second voltage measured for the second GPIO pin. Moreover, each pair of non-GPIO pins can be operatively coupled to a respective pair of pins of a USB-C receptacle. To measure the pair of voltages, the processing logic can utilize an ADC to determine each voltage of the pair of voltages.

In some embodiments, the MUX is an internal MUX within the USB-C controller. In some embodiments, the MUX is an external MUX outside of the USB-C controller. For example, the external MUX can be controlled by the USB-C controller using GPIO/I$^2$C.

In some embodiments, the pair of non-GPIO pins is a pair of data line pins, and the pair of GPIO pins can include the GPIO$_1$ pin and the GPIO$_2$ pin. For example, if the USB-C device is a USB-C receptacle, then the pair of data line pins can be one of the pair of DP$_1$/DN$_1$ pins or the pair of DP$_2$/DN$_2$ pins. The MUX can be a first MUX through which the USB-C controller can selectively connect the pair of data line pins (which are connected to a respective pair of data line pins of the USB-C receptacle or USB-C plug) to the GPIO$_1$ pin and the GPIO$_2$ pin. For example, the first MUX can be a 2×1 MUX (e.g., an external MUX). As another example, the first MUX can be a 2×2 MUX (e.g., an internal MUX or an external MUX). As another example, if the USB-C device is a USB-C plug, then the pair of data line pins can be the pair of DP/DN pins. The MUX can be a first MUX through which the USB-C controller can selectively connect the pair of data line pins (which are connected to a respective pair of data line pins of the USB-C receptacle or USB-C plug) to the GPIO$_1$ pin and the GPIO$_2$ pin. For example, the first MUX can be a 2×1 MUX (e.g., an internal MUX or an external MUX). Accordingly, in these embodiments, the first voltage can be the voltage measured for the GPIO$_1$ pin, and the second voltage can be the voltage measured for the GPIO$_2$ pin.

In some embodiments, the pair of pins can be a pair of SBU pins (e.g., SBU$_1$/SBU$_2$ pins), and the pair of GPIO pins can include the GPIO$_3$ pin and the GPIO$_4$ pin. The MUX can be a second MUX through which the USB-C controller can selectively connect the pair of SBU pins (which are connected to a respective pair of SBU pins of the USB-C receptacle) to the GPIO$_3$ pin and the GPIO$_4$ pin. For example, if the USB-C device is a USB-C receptacle, then the second MUX can be a 4×2 MUX (e.g., an internal MUX) or a 2×1 MUX (e.g., an external MUX. As another example, if the USB-C device is a USB-C plug, then the second MUX can be a 2×1 MUX (e.g., an internal MUX or an external MUX). Accordingly, in these embodiments, the first voltage can be the voltage measured for the GPIO$_3$ pin, and the second voltage can be the voltage measured for the GPIO$_4$ pin.

At block 1030, processing logic determines whether the pair of voltages satisfies a threshold condition. Determining whether the pair of voltages satisfies the threshold condition can include determining whether the first voltage (e.g., the voltage of the GPIO$_1$ pin or the voltage of the GPIO$_3$ pin) is greater than a first threshold voltage and determining whether the second voltage (e.g., the voltage of the GPIO$_2$ pin or the voltage of the GPIO$_4$ pin) is less than a second threshold voltage. In some embodiments, the first threshold voltage is about 3.2 V and the second threshold voltage is about 0.1 V.

If the pair of voltages satisfies the threshold condition, this means that a liquid is not present on the USB-C device. Thus, at block 1040, processing logic can continue operation of the USB-C device. The process can be periodically repeated to determine the presence of liquid on the USB-C device.

Otherwise, if the pair of voltages does not satisfy the threshold condition, this means that the USB-C device has been exposed to a liquid. At block 1050, processing logic can suspend the operation of the USB-C device. For example, processing logic can cause the operation of the USB-C device to be suspended.

At block 1060, processing logic can determine whether to resume operation of the USB-C device. For example, processing logic can continue scanning (e.g., periodically scanning) the USB-C device to determine whether liquid may still be present on the USB-C device. If it is determined that operation of the USB-C device should be resumed, then the process can proceed to block 1040 to continue operation of the USB-C device. For example, processing logic can remove the suspend and enable the USB-C port to connect to an external device. Otherwise, the process can revert to block 1050 to maintain the suspension of the operation of the USB-C device. Further details regarding blocks 1010-1060 are described above with reference to FIGS. 1-8B

In the above description, some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "driving," "receiving," "controlling," "pulling down," "shorting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, the use of the words "example" or "exemplary" is intended to present concepts in a concrete fashion. As used in this application, the term "or" is intended to mean an inclusive "or" rather than an exclusive "or." Unless specified otherwise or clear from context, "X includes A or B" is intended to mean any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments described herein may also relate to an apparatus for performing the operations herein. This apparatus may be specially constructed for the required purposes, or it may comprise firmware instructions stored in a suitable storage medium. For example, such firmware instructions may be stored in a non-transitory computer-readable storage medium, such as, but not limited to, any type of memory, such as read-only memories (ROMs), random access memories (RAMs), EPROMs, EEPROMs, flash memory, or any type of media suitable for storing electronic instructions. The term "computer-readable storage medium" should be taken to include a single medium or multiple media that store one or more sets of instructions. The term "computer-readable medium" shall also be taken to include any medium capable of storing, encoding, or carrying a set of instructions for execution by a machine or device, which causes the machine or device to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by a machine or device and that causes the machine or device to perform any one or more of the methodologies of the present embodiments.

The above description sets forth numerous specific details, such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A system comprising:
   a Universal Serial Bus Type-C (USB-C) receptacle comprising a first data line pin and a second data line pin; and
   a USB-C controller comprising:
   a pair of general-purpose input/output (GPIO) pins comprising a first GPIO pin connected to a pull-up resistor and a second GPIO pin connected to a pull-down resistor;
   a pair of data line pins comprising a third data line pin corresponding to the first data line pin and a fourth data line pin corresponding to the second data line pin, wherein the pair of GPIO pins is selectively connectable to the pair of data line pins using a multiplexer; and
   liquid exposure detection circuitry configured to:

cause a pair of voltages to be measured, the pair of voltages comprising a first voltage for the first GPIO and a second voltage for the second GPIO;
determine whether the pair of voltages satisfies a threshold condition; and
in response to determining that the pair of voltages does not satisfy the threshold condition, cause operation of the USB-C receptacle to be suspended.

2. The system of claim 1, wherein, to determine whether the pair of voltage satisfies the threshold condition, the liquid exposure detection circuitry is further configured to determine whether the first voltage is greater than a first threshold voltage and determine whether the second voltage is less than a second threshold voltage.

3. The system of claim 1, wherein the liquid exposure detection circuitry is further configured to:
determine whether to resume the operation of the USB-C receptacle by continuing to scan the USB-C receptacle; and
in response to determining to resume the operation of the USB-C receptacle, resuming operation of the USB-C receptacle.

4. The system of claim 1, wherein the multiplexer is an internal multiplexer of the USB-C controller.

5. The system of claim 4, wherein the internal multiplexer is a 2×2 multiplexer comprising the pair of GPIO pins, the pair of data line pins, and a pair of system data line pins.

6. The system of claim 1, wherein the multiplexer is an external multiplexer operatively coupled to the USB-C receptacle and the USB-C controller.

7. The system of claim 6, wherein the external multiplexer is one of: a 2×1 multiplexer or a 2×2 multiplexer.

8. A system comprising:
a Universal Serial Bus Type-C (USB-C) receptacle comprising a first sideband use (SBU) pin and a second SBU pin; and
a USB-C controller comprising:
a pair of general-purpose input/output (GPIO) pins comprising a first GPIO pin connected to a pull-up resistor and a second GPIO pin connected to a pull-down resistor;
a pair of SBU pins comprising a third SBU pin corresponding to the first SBU pin and a fourth SBU pin corresponding to the second SBU pin, wherein the pair of GPIO pins is selectively connectable to the pair of SBU pins using a multiplexer; and
liquid exposure detection circuitry comprising processing logic configured to:
cause a pair of voltages to be measured, the pair of voltages comprising a first voltage for the first GPIO and a second voltage for the second GPIO;
determine whether the pair of voltages satisfies a threshold condition; and
in response to determining that the pair of voltages does not satisfy the threshold condition, cause operation of the USB-C receptacle to be suspended.

9. The system of claim 8, wherein, to determine whether the pair of voltage satisfies the threshold condition, the liquid exposure detection circuitry is further configured to determine whether the first voltage is greater than a first threshold voltage and determine whether the second voltage is less than a second threshold voltage.

10. The system of claim 8, wherein the liquid exposure detection circuitry is further configured to:
determine whether to resume the operation of the USB-C receptacle by continuing to scan the USB-C receptacle; and
in response to determining to resume the operation of the USB-C receptacle, resuming operation of the USB-C receptacle.

11. The system of claim 8, wherein the multiplexer is an internal multiplexer of the USB-C controller.

12. The system of claim 11, wherein the internal multiplexer is a 4×2 multiplexer comprising the pair of GPIO pins, the pair of SBU pins, and a pair of auxiliary line pins.

13. The system of claim 8, wherein the multiplexer is an external multiplexer operatively coupled to the USB-C receptacle and the USB-C controller.

14. The system of claim 13, wherein the external multiplexer is a 2×1 multiplexer.

15. A method of operating a Universal Serial Bus Type-C (USB-C) controller, the method comprising:
selectively connecting a pair of general-purpose input/output (GPIO) pins to a pair of non-GPIO pins, wherein the pair of GPIO pins comprises a first GPIO pin connected to a pull-up resistor and a second GPIO pin connected to a pull-down resistor, wherein the pair of non-GPIO pins comprises a first non-GPIO pin and a second non-GPIO pin, and wherein the pair of non-GPIO pins comprises one of: a pair of data line pins, or a pair of sideband use pins;
causing a pair of voltages to be measured, the pair of voltages comprising a first voltage for the first GPIO and a second voltage for the second GPIO;
determining whether the pair of voltages satisfies a threshold condition; and
in response to determining that the pair of voltages does not satisfy the threshold condition, causing operation of a USB-C receptacle operatively coupled to the USB-C controller to be suspended, wherein the USB-C receptacle comprises a third non-GPIO pin corresponding to the first non-GPIO pin and a fourth non-GPIO pin corresponding to the second non-GPIO pin.

16. The method of claim 15, wherein determining whether the pair of voltages satisfies the threshold condition further comprises determining whether the first voltage is greater than a first threshold voltage and determining whether the second voltage is less than a second threshold voltage.

17. The method of claim 15, further comprising:
determining whether to resume the operation of the USB-C receptacle by continuing to scan the USB-C receptacle; and
in response to determining to resume the operation of the USB-C receptacle, resuming operation of the USB-C receptacle.

18. The method of claim 15, wherein selectively connecting the pair of GPIO pins to the pair of non-GPIO pins comprises using a 2×2 internal multiplexer of the USB-C controller, the 2×2 internal multiplexer comprising the pair of GPIO pins, the pair of data lines pins, and a pair of system data line pins.

19. The method of claim 15, wherein selectively connecting the pair of GPIO pins to the pair of non-GPIO pins comprises using a 4×2 internal multiplexer of the USB-C controller comprising the pair of GPIO pins, the pair of SBU pins, and a pair of auxiliary line pins.

20. The method of claim 15, wherein selectively connecting the pair of GPIO pins to the pair of non-GPIO pins comprises using an external multiplexer operatively coupled to the USB-C receptacle and the USB-C controller, and wherein the external multiplexer is one of: a 2×1 multiplexer or a 2×2 multiplexer.

* * * * *